(12) United States Patent
Chen et al.

(10) Patent No.: US 10,185,124 B2
(45) Date of Patent: Jan. 22, 2019

(54) OPTICAL LENS ASSEMBLY

(71) Applicant: GENIUS ELECTRONIC OPTICAL CO., LTD., Taichung (TW)

(72) Inventors: Feng Chen, Xiamen (CN); Huifeng Pan, Xiamen (CN); Zhenfeng Xie, Xiamen (CN)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 0 days.

(21) Appl. No.: 15/466,818

(22) Filed: Mar. 22, 2017

(65) Prior Publication Data
US 2018/0239112 A1    Aug. 23, 2018

(30) Foreign Application Priority Data
Feb. 22, 2017 (CN) .......................... 2017 1 0097277

(51) Int. Cl.
*G02B 9/60*    (2006.01)
*G02B 13/00*   (2006.01)

(52) U.S. Cl.
CPC ........... *G02B 13/0045* (2013.01); *G02B 9/60* (2013.01)

(58) Field of Classification Search
USPC .................................. 359/714, 761, 770, 763
See application file for complete search history.

(56) References Cited

U.S. PATENT DOCUMENTS

2014/0009844 A1*   1/2014   Tsai .......................... G02B 9/62
                                                                   359/713

* cited by examiner

*Primary Examiner* — Darryl J Collins
(74) *Attorney, Agent, or Firm* — Baker & McKenzie LLP

(57) ABSTRACT

Present embodiments provide for an optical lens assembly. The optical lens assembly includes a first lens element, a second lens element, a third lens element, a fourth lens element, and a fifth lens element positioned sequentially from an object side to an image side. Through arrangement of convex or concave surfaces of the five lens elements, the length of the optical lens assembly may be shortened while providing better optical characteristics and imaging quality.

20 Claims, 40 Drawing Sheets

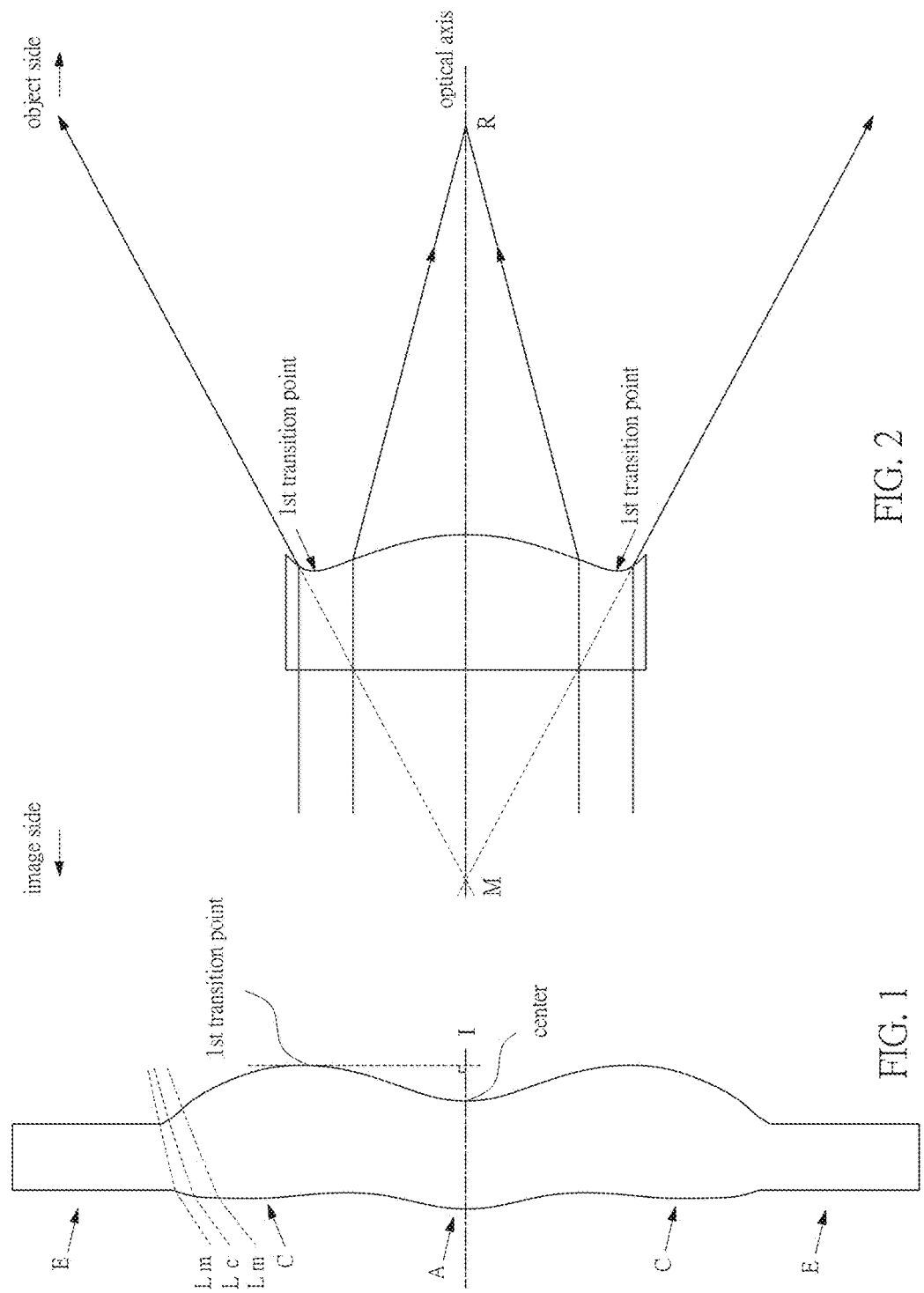

| Effective focal length (EFL) = 1.204 mm, HFOV (Half field of view) = 55.813 deg., TTL = 3.946 mm, Image height= 1.815 mm, Fno = 2.388 ||||||||
| --- | --- | --- | --- | --- | --- | --- | --- |
| Surface # | | Radius (mm) | Thickness (mm) | Refractive index | Abbe number | Focus (mm) | Material |
| - | Object | ∞ | ∞ | | | | |
| 111 | 1st lens element | 13.118 | 0.377 | 1.545 | 55.987 | -1.351 | plastic |
| 112 | | 0.692 | 0.320 | | | | |
| 121 | 2nd lens element | 0.782 | 0.474 | 1.642 | 22.409 | 1.984 | plastic |
| 122 | | 1.526 | 0.099 | | | | |
| 100 | Aperture stop | 0.000 | -0.021 | | | | |
| 131 | 3rd lens element | 2.247 | 0.732 | 1.545 | 55.987 | 0.691 | plastic |
| 132 | | -0.401 | 0.060 | | | | |
| 141 | 4th lens element | -0.337 | 0.237 | 1.642 | 22.409 | -0.754 | plastic |
| 142 | | -1.391 | 0.181 | | | | |
| 151 | 5th lens element | 0.584 | 0.546 | 1.535 | 55.712 | 1.563 | plastic |
| 152 | | 1.298 | 0.400 | | | | |
| 161 | IR cut filter | ∞ | 0.210 | 1.517 | 64.167 | | plastic |
| 162 | | ∞ | 0.331 | | | | |
| 170 | Image plane | ∞ | | | | | |

FIG. 8

| Aspherical parameters | | | | | |
|---|---|---|---|---|---|
| Surface # | K | A2 | A4 | A6 | A8 |
| 111 | -1.254990E+03 | 0.000000E+00 | 2.076053E-01 | -3.715396E-01 | 4.215003E-01 |
| 112 | -6.286722E-01 | 0.000000E+00 | -1.716468E-01 | 4.837253E-01 | -4.647833E+00 |
| 121 | -5.933220E+00 | 0.000000E+00 | 1.203107E+00 | -3.558725E+00 | 2.289094E+00 |
| 122 | 4.967064E+00 | 0.000000E+00 | 1.246543E-01 | 2.154642E+00 | -8.770707E+00 |
| 131 | 9.970402E+00 | 0.000000E+00 | -3.007943E-02 | 3.981783E+00 | -5.994303E+01 |
| 132 | -7.193326E+00 | 0.000000E+00 | 3.907436E-01 | -1.404399E+01 | 6.371661E+01 |
| 141 | -6.228884E+00 | 0.000000E+00 | 2.617481E-01 | -5.332260E+00 | -2.131336E+00 |
| 142 | -8.892636E+00 | 0.000000E+00 | -8.229004E-01 | 2.639089E+00 | -3.163815E+00 |
| 151 | -7.676028E+00 | 0.000000E+00 | -2.002677E-01 | 1.817991E-01 | -8.110214E-02 |
| 152 | -9.817138E+00 | 0.000000E+00 | -7.353254E-02 | -2.187614E-03 | 1.282403E-02 |
| Surface # | A10 | A12 | A14 | A16 | |
| 111 | -2.237986E-01 | 3.332172E-02 | 1.420851E-02 | -4.490527E-03 | |
| 112 | 8.330744E+00 | 8.853468E+00 | -1.822012E+01 | -8.173373E-01 | |
| 121 | 2.484489E+01 | -3.938733E+01 | 0.000000E+00 | 0.000000E+00 | |
| 122 | 2.566465E+02 | -8.372080E+02 | 0.000000E+00 | 0.000000E+00 | |
| 131 | 7.029082E+02 | -4.674509E+03 | -3.099176E+04 | -1.093633E+05 | |
| 132 | -2.876211E+02 | 8.895529E+02 | -1.554445E+03 | 1.774003E+03 | |
| 141 | 1.900543E+01 | -5.143731E+01 | 1.929689E+02 | -5.695540E+01 | |
| 142 | -7.075096E-01 | 5.582459E+00 | -3.646809E+00 | -1.510426E-01 | |
| 151 | 6.907442E-03 | 5.716693E-03 | -1.258089E-03 | 8.618030E-06 | |
| 152 | -3.512947E-03 | -9.894422E-04 | 3.668966E-04 | -1.093291E-05 | |

FIG. 9

| Effective focal length (EFL) = 1.337 mm・HFOV (Half field of view) = 55.473 deg.・ TTL = 3.978 mm・Image height= 1.815 mm・Fno = 2.357 |||||||
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 211 | 1st lens element | 16.643 | 0.454 | 1.545 | 55.987 | -1.362 | plastic |
| 212 | | 0.705 | 0.246 | | | | |
| 221 | 2nd lens element | 0.772 | 0.455 | 1.642 | 22.409 | 1.948 | plastic |
| 222 | | 1.530 | 0.060 | | | | |
| 200 | Aperture stop | 0.000 | -0.028 | | | | |
| 231 | 3rd lens element | 2.137 | 0.753 | 1.545 | 55.987 | 0.700 | plastic |
| 232 | | -0.408 | 0.055 | | | | |
| 241 | 4th lens element | -0.337 | 0.272 | 1.642 | 22.409 | -0.742 | plastic |
| 242 | | -1.482 | 0.154 | | | | |
| 251 | 5th lens element | 0.593 | 0.636 | 1.535 | 55.712 | 1.552 | plastic |
| 252 | | 1.285 | 0.500 | | | | |
| 261 | IR cut filter | ∞ | 0.210 | 1.517 | 64.167 | | plastic |
| 262 | | ∞ | 0.212 | | | | |
| 270 | Image plane | ∞ | | | | | |

FIG. 12

| Aspherical parameters | | | | | |
|---|---|---|---|---|---|
| Surface # | K | A2 | A4 | A6 | A8 |
| 211 | -2.127483E+02 | 0.000000E+00 | 2.062847E-01 | -3.720952E-01 | 4.210007E-01 |
| 212 | -6.459696E-01 | 0.000000E+00 | -2.206098E-01 | 4.968454E-01 | -4.517019E+00 |
| 221 | -6.023360E+00 | 0.000000E+00 | 1.051436E+00 | -3.672688E+00 | 2.434537E+00 |
| 222 | 2.927882E+00 | 0.000000E+00 | -4.548477E-02 | 2.507816E+00 | -1.015031E+01 |
| 231 | 9.995476E+00 | 0.000000E+00 | -2.609127E-02 | 3.638176E+00 | -5.985719E+01 |
| 232 | -6.915381E+00 | 0.000000E+00 | 4.804097E-01 | -1.380259E+01 | 6.229415E+01 |
| 241 | -6.354430E+00 | 0.000000E+00 | 2.325749E-01 | -5.302504E+00 | -1.470940E+00 |
| 242 | -8.249319E+00 | 0.000000E+00 | -8.409355E-01 | 2.628162E+00 | -3.186637E+00 |
| 251 | -8.174878E+00 | 0.000000E+00 | -1.988634E-01 | 1.818295E-01 | -8.107955E-02 |
| 252 | -7.474500E+00 | 0.000000E+00 | -7.605464E-02 | -2.695222E-03 | 1.272124E-02 |
| Surface # | A10 | A12 | A14 | A16 | |
| 211 | -2.239700E-01 | 3.341160E-02 | 1.435326E-02 | -4.532929E-03 | |
| 212 | 8.758675E+00 | 9.575543E+00 | -1.822682E+01 | -6.726032E+00 | |
| 221 | 2.565285E+01 | -4.461567E+01 | 0.000000E+00 | 0.000000E+00 | |
| 222 | 2.112934E+02 | -6.900650E+02 | 0.000000E+00 | 0.000000E+00 | |
| 231 | 7.074466E+02 | -4.586752E+03 | 3.000944E+04 | -1.142726E+05 | |
| 232 | -2.874087E+02 | 8.881542E+02 | -1.553826E+03 | 1.777330E+03 | |
| 241 | 1.962401E+01 | -5.338127E+01 | 1.948363E+02 | -7.378819E+01 | |
| 242 | -7.199820E-01 | 5.553240E+00 | -3.575945E+00 | -1.572232E-01 | |
| 251 | 6.914468E-03 | 5.711254E-03 | -1.267919E-03 | 1.067462E-06 | |
| 252 | -3.542132E-03 | -9.992206E-04 | 3.648980E-04 | -1.275747E-05 | |

FIG. 13

| Effective focal length (EFL) = 1.336 mm, HFOV (Half field of view) = 55.454 deg., TTL = 3.985 mm, Image height = 1.815 mm, Fno = 2.505 ||||||||
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 311 | 1st lens element | 147.090 | 0.241 | 1.545 | 55.987 | -1.311 | plastic |
| 312 | | 0.713 | 0.276 | | | | |
| 321 | 2nd lens element | 0.779 | 0.460 | 1.642 | 22.409 | 1.992 | plastic |
| 322 | | 1.511 | 0.119 | | | | |
| 300 | Aperture stop | 0.000 | -0.026 | | | | |
| 331 | 3rd lens element | 2.264 | 0.659 | 1.545 | 55.987 | 0.695 | plastic |
| 332 | | -0.409 | 0.048 | | | | |
| 341 | 4th lens element | -0.335 | 0.335 | 1.642 | 22.409 | -0.761 | plastic |
| 342 | | -1.460 | 0.060 | | | | |
| 351 | 5th lens element | 0.601 | 0.519 | 1.535 | 55.712 | 1.612 | plastic |
| 352 | | 1.372 | 0.500 | | | | |
| 361 | IR cut filter | ∞ | 0.210 | 1.517 | 64.167 | | plastic |
| 362 | | ∞ | 0.584 | | | | |
| 370 | Image plane | ∞ | | | | | |

FIG. 16

| Aspherical parameters | | | | | |
|---|---|---|---|---|---|
| Surface # | K | A2 | A4 | A6 | A8 |
| 311 | 1.228637E+04 | 0.000000E+00 | 2.097449E-01 | -3.713018E-01 | 4.203428E-01 |
| 312 | -6.659759E-01 | 0.000000E+00 | -1.787204E-01 | 4.040222E-01 | -4.731651E+00 |
| 321 | -7.041672E+00 | 0.000000E+00 | 1.163180E+00 | -3.705166E+00 | 1.847935E+00 |
| 322 | 4.458712E+00 | 0.000000E+00 | 1.158773E-01 | 1.591196E+00 | -1.435283E+01 |
| 331 | 9.924744E+00 | 0.000000E+00 | -2.788388E-02 | 3.771409E+00 | -6.187883E+01 |
| 332 | -7.303846E+00 | 0.000000E+00 | 3.550519E-01 | -1.414881E+01 | 6.346197E+01 |
| 341 | -6.080346E+00 | 0.000000E+00 | 2.855786E-01 | -5.327956E+00 | -2.529498E+00 |
| 342 | -7.345391E+00 | 0.000000E+00 | -8.394574E-01 | 2.644250E+00 | -3.161904E+00 |
| 351 | -8.801552E+00 | 0.000000E+00 | -2.028013E-01 | 1.801852E-01 | -8.151481E-02 |
| 352 | -7.256204E+00 | 0.000000E+00 | -7.188109E-02 | 4.924988E-04 | 1.311469E-02 |
| Surface # | A10 | A12 | A14 | A16 | |
| 311 | -2.253157E-01 | 3.259137E-02 | 1.414881E-02 | -4.278933E-03 | |
| 312 | 8.339949E+00 | 8.993640E+00 | -1.796519E+01 | -8.274743E-01 | |
| 321 | 2.461336E+01 | -3.673030E+01 | 0.000000E+00 | 0.000000E+00 | |
| 322 | 2.377852E+02 | -5.771535E+02 | 0.000000E+00 | 0.000000E+00 | |
| 331 | 6.714171E+02 | -4.795475E+03 | -3.036496E+04 | -9.834281E+04 | |
| 332 | -2.881476E+02 | 8.866590E+02 | -1.549712E+03 | 1.838829E+03 | |
| 341 | 1.769681E+01 | -5.275101E+01 | 1.969533E+02 | -4.929639E+01 | |
| 342 | -7.251670E-01 | 5.468990E+00 | -3.703963E+00 | 4.180953E-02 | |
| 351 | 7.311270E-03 | 6.436786E-03 | -1.103701E-03 | -6.924135E-04 | |
| 352 | -3.639832E-03 | -1.160027E-03 | 2.895081E-04 | -7.498863E-06 | |

FIG. 17

| Effective focal length (EFL) = 0.795 mm, HFOV (Half field of view) = 59.404 deg., TTL = 3.700 mm, Image height= 1.815 mm, Fno = 2.338 ||||||||
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 411 | 1st lens element | 14.560 | 0.250 | 1.545 | 55.987 | -1.182 | plastic |
| 412 | | 0.615 | 0.338 | | | | |
| 421 | 2nd lens element | 0.817 | 0.495 | 1.642 | 22.409 | 2.139 | plastic |
| 422 | | 1.517 | 0.098 | | | | |
| 400 | Aperture stop | 0.000 | -0.001 | | | | |
| 431 | 3rd lens element | 2.043 | 0.733 | 1.545 | 55.987 | 0.686 | plastic |
| 432 | | -0.401 | 0.052 | | | | |
| 441 | 4th lens element | -0.338 | 0.401 | 1.642 | 22.409 | -0.887 | plastic |
| 442 | | -1.203 | 0.074 | | | | |
| 451 | 5th lens element | 0.558 | 0.562 | 1.535 | 55.712 | 1.200 | plastic |
| 452 | | 2.694 | 0.400 | | | | |
| 461 | IR cut filter | ∞ | 0.210 | 1.517 | 64.167 | | plastic |
| 462 | | ∞ | 0.089 | | | | |
| 470 | Image plane | ∞ | | | | | |

FIG. 20

| Aspherical parameters | | | | | |
|---|---|---|---|---|---|
| Surface # | K | A2 | A4 | A6 | A8 |
| 411 | -3.772580E+02 | 0.000000E+00 | 2.068781E-01 | -3.719720E-01 | 4.215869E-01 |
| 412 | -7.036237E-01 | 0.000000E+00 | -3.173526E-01 | 4.810206E-01 | -4.635136E+00 |
| 421 | -6.198157E+00 | 0.000000E+00 | 1.201633E+00 | -3.259238E+00 | 2.789423E+00 |
| 422 | 7.858183E+00 | 0.000000E+00 | 2.168837E-01 | 4.702286E+00 | -2.989551E+00 |
| 431 | 1.297321E+01 | 0.000000E+00 | 6.112185E-02 | 3.133172E+00 | -7.052447E+01 |
| 432 | -6.594496E+00 | 0.000000E+00 | 3.687482E-01 | -1.430647E+01 | 6.301836E+01 |
| 441 | -6.582770E+00 | 0.000000E+00 | 3.071633E-01 | -5.154836E+00 | -2.863053E+00 |
| 442 | -3.027883E+00 | 0.000000E+00 | -8.972345E-01 | 2.683719E+00 | -3.109621E+00 |
| 451 | -7.815304E+00 | 0.000000E+00 | -1.919209E-01 | 1.748870E-01 | -8.274526E-02 |
| 452 | -1.180756E+02 | 0.000000E+00 | -5.259058E-02 | 4.971602E-03 | 1.297767E-02 |
| Surface # | A10 | A12 | A14 | A16 | |
| 411 | -2.237837E-01 | 3.333915E-02 | 1.423650E-02 | -4.487207E-03 | |
| 412 | 8.387713E+00 | 8.977197E+00 | -1.793297E+01 | -3.378623E-01 | |
| 421 | 2.523441E+01 | -3.935122E+01 | 0.000000E+00 | 0.000000E+00 | |
| 422 | 2.047035E+02 | -1.457151E+03 | 0.000000E+00 | 0.000000E+00 | |
| 431 | 6.176095E+02 | -4.935026E+03 | 3.386813E+04 | 1.948820E+03 | |
| 432 | -2.888055E+02 | 8.854299E+02 | -1.569429E+03 | 1.695940E+03 | |
| 441 | 1.529699E+01 | -6.085090E+01 | 1.781812E+02 | -5.264428E+01 | |
| 442 | -6.678881E-01 | 5.550266E+00 | -3.639957E+00 | -1.111080E-01 | |
| 451 | 6.662467E-03 | 5.708612E-03 | -1.235275E-03 | 2.216594E-05 | |
| 452 | -3.737317E-03 | -1.076420E-03 | 3.367247E-04 | -2.243538E-05 | |

FIG. 21

| Effective focal length (EFL) = 1.268 mm, HFOV (Half field of view) = 55.47 deg., TTL = 3.841 mm, Image height = 1.815 mm, Fno = 2.323 | | | | | | | |
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 511 | 1st lens element | 27.693 | 0.249 | 1.545 | 55.987 | -1.330 | plastic |
| 512 | | 0.706 | 0.249 | | | | |
| 521 | 2nd lens element | 0.769 | 0.462 | 1.642 | 22.409 | 1.896 | plastic |
| 522 | | 1.571 | 0.076 | | | | |
| 500 | Aperture stop | 0.000 | -0.023 | | | | |
| 531 | 3rd lens element | 2.139 | 0.718 | 1.545 | 55.987 | 0.686 | plastic |
| 532 | | -0.400 | 0.046 | | | | |
| 541 | 4th lens element | -0.343 | 0.363 | 1.642 | 22.409 | -0.794 | plastic |
| 542 | | -1.455 | 0.195 | | | | |
| 551 | 5th lens element | 0.597 | 0.656 | 1.535 | 55.712 | 1.690 | plastic |
| 552 | | 1.076 | 0.500 | | | | |
| 561 | IR cut filter | ∞ | 0.210 | 1.517 | 64.167 | | plastic |
| 562 | | ∞ | 0.140 | | | | |
| 570 | Image plane | ∞ | | | | | |

FIG. 24

| Aspherical parameters | | | | | |
|---|---|---|---|---|---|
| Surface # | K | A2 | A4 | A6 | A8 |
| 511 | 3.244808E+02 | 0.000000E+00 | 2.200314E-01 | -3.717329E-01 | 4.209231E-01 |
| 512 | -6.959102E-01 | 0.000000E+00 | -2.072092E-01 | 4.225932E-01 | -4.520798E+00 |
| 521 | -6.375755E+00 | 0.000000E+00 | 1.130192E+00 | -3.543119E+00 | 2.683411E+00 |
| 522 | 5.455703E+00 | 0.000000E+00 | 1.489035E-01 | 2.410993E+00 | -1.025316E+01 |
| 531 | 9.724712E+00 | 0.000000E+00 | -2.512182E-02 | 3.591848E+00 | -6.016617E+01 |
| 532 | -6.818116E+00 | 0.000000E+00 | 4.165757E-01 | -1.418121E+01 | 6.294256E+01 |
| 541 | -6.432995E+00 | 0.000000E+00 | 2.199996E-01 | -5.255061E+00 | -1.886786E+00 |
| 542 | -7.556667E+00 | 0.000000E+00 | -8.495142E-01 | 2.639882E+00 | -3.148676E+00 |
| 551 | -7.314082E+00 | 0.000000E+00 | -1.989361E-01 | 1.781352E-01 | -8.223772E-02 |
| 552 | -1.671899E+01 | 0.000000E+00 | -6.439981E-02 | -4.714928E-04 | 1.251861E-02 |

| Surface # | A10 | A12 | A14 | A16 | |
|---|---|---|---|---|---|
| 511 | -2.240424E-01 | 3.324995E-02 | 1.422800E-02 | -4.438869E-03 | |
| 512 | 8.659667E+00 | 9.200448E+00 | -1.795769E+01 | -7.176510E-01 | |
| 521 | 2.504913E+01 | -4.027426E+01 | 0.000000E+00 | 0.000000E+00 | |
| 522 | 2.382198E+02 | -8.749523E+02 | 0.000000E+00 | 0.000000E+00 | |
| 531 | 6.991058E+02 | -4.658355E+03 | -2.996383E+04 | -1.149359E+05 | |
| 532 | -2.890223E+02 | 8.856109E+02 | -1.554257E+03 | 1.796762E+03 | |
| 541 | 1.908854E+01 | -5.117763E+01 | 1.931913E+02 | -6.894516E+01 | |
| 542 | -6.866284E-01 | 5.549698E+00 | -3.620447E+00 | -6.466818E-02 | |
| 551 | 6.463109E-03 | 5.554884E-03 | -1.281535E-03 | 4.416157E-05 | |
| 552 | -3.587243E-03 | -1.015174E-03 | 3.568224E-04 | -1.795016E-05 | |

FIG. 25

| Effective focal length（EFL）= 0.991 mm，HFOV（Half field of view）= 56.182 deg.， TTL = 3.548 mm，Image height= 1.815 mm，Fno = 2.358 |||||||
|---|---|---|---|---|---|---|---|
| Surface # | | Radius (mm) | Thickness (mm) | Refractive index | Abbe number | Focus (mm) | Material |
| .. | Object | ∞ | ∞ | | | | |
| 611 | 1st lens element | 3.428 | 0.246 | 1.545 | 55.987 | -1.477 | plastic |
| 612 | | 0.636 | 0.392 | | | | |
| 621 | 2nd lens element | 0.826 | 0.468 | 1.642 | 22.409 | 2.094 | plastic |
| 622 | | 1.642 | 0.061 | | | | |
| 600 | Aperture stop | 0.000 | -0.016 | | | | |
| 631 | 3rd lens element | 1.864 | 0.755 | 1.545 | 55.987 | 0.745 | plastic |
| 632 | | -0.446 | 0.095 | | | | |
| 641 | 4th lens element | -0.304 | 0.378 | 1.642 | 22.409 | -0.894 | plastic |
| 642 | | -0.955 | 0.015 | | | | |
| 651 | 5th lens element | 0.478 | 0.453 | 1.535 | 55.712 | 1.391 | plastic |
| 652 | | 0.889 | 0.400 | | | | |
| 661 | IR cut filter | ∞ | 0.210 | 1.517 | 64.167 | | plastic |
| 662 | | ∞ | 0.090 | | | | |
| 670 | Image plane | ∞ | | | | | |

FIG. 28

| Aspherical parameters | | | | | |
|---|---|---|---|---|---|
| Surface # | K | A2 | A4 | A6 | A8 |
| 611 | -1.921365E+01 | 0.000000E+00 | 1.975033E-01 | -3.637520E-01 | 4.247826E-01 |
| 612 | -6.136638E-01 | 0.000000E+00 | -1.472849E-01 | 5.246518E-01 | -4.827619E+00 |
| 621 | -6.478003E+00 | 0.000000E+00 | 1.148243E+00 | -3.063498E+00 | 2.510752E+00 |
| 622 | 8.175139E+00 | 0.000000E+00 | 1.877217E-01 | 4.165130E+00 | 6.474411E+00 |
| 631 | 1.506672E+01 | 0.000000E+00 | 1.680696E-01 | 4.914627E+00 | -6.845667E+01 |
| 632 | -6.414326E+00 | 0.000000E+00 | 3.054711E-01 | -1.351357E+01 | 6.536217E+01 |
| 641 | -5.508251E+00 | 0.000000E+00 | 9.349767E-02 | -4.861865E+00 | -2.640368E+00 |
| 642 | -6.457150E+00 | 0.000000E+00 | -9.965729E-01 | 2.624765E+00 | -3.120349E+00 |
| 651 | -5.858876E+00 | 0.000000E+00 | -2.201448E-01 | 1.707623E-01 | -8.306855E-02 |
| 652 | -4.288191E+00 | 0.000000E+00 | -5.470228E-02 | -1.111778E-02 | 1.408350E-02 |
| Surface # | A10 | A12 | A14 | A16 | |
| 611 | -2.235090E-01 | 3.297706E-02 | 1.394859E-02 | -4.627141E-03 | |
| 612 | 7.986432E+00 | 8.515545E+00 | -1.826243E+01 | -3.117302E-01 | |
| 621 | 2.237704E+01 | -4.610927E+01 | 0.000000E+00 | 0.000000E+00 | |
| 622 | 1.701390E+02 | -2.021102E+03 | 0.000000E+00 | 0.000000E+00 | |
| 631 | 6.726233E+02 | -3.618720E+03 | -4.033740E+04 | -3.921937E+05 | |
| 632 | -2.834482E+02 | 8.890815E+02 | -1.567707E+03 | 1.978284E+03 | |
| 641 | 1.145438E+01 | -6.739915E+01 | 2.189826E+02 | 2.709818E+02 | |
| 642 | -6.492823E-01 | 5.571808E+00 | -3.638072E+00 | -1.260074E-01 | |
| 651 | 6.665802E-03 | 5.783287E-03 | -1.137214E-03 | 1.210284E-04 | |
| 652 | -2.614197E-03 | -8.242663E-04 | 3.492729E-04 | -3.998489E-05 | |

FIG. 29

| Effective focal length (EFL) = 1.113 mm, HFOV (Half field of view) = 59.371 deg., TTL = 3.987 mm, Image height= 1.815 mm, Fno = 2.485 |||||||
|---|---|---|---|---|---|---|---|
| Surface # | | Radius (mm) | Thickness (mm) | Refractive index | Abbe number | Focus (mm) | Material |
| . | Object | ∞ | ∞ | | | | |
| 711 | 1st lens element | -53.031 | 0.279 | 1.540 | 59.709 | -1.278 | plastic |
| 712 | | 0.703 | 0.256 | | | | |
| 721 | 2nd lens element | 0.903 | 0.467 | 1.617 | 30.973 | 2.277 | plastic |
| 722 | | 2.008 | 0.094 | | | | |
| 700 | Aperture stop | 0.000 | -0.025 | | | | |
| 731 | 3rd lens element | 1.943 | 0.898 | 1.545 | 55.987 | 0.729 | plastic |
| 732 | | -0.419 | 0.049 | | | | |
| 741 | 4th lens element | -0.304 | 0.255 | 1.642 | 22.409 | -0.746 | plastic |
| 742 | | -1.091 | 0.005 | | | | |
| 751 | 5th lens element | 0.577 | 0.807 | 1.535 | 55.712 | 1.278 | plastic |
| 752 | | 1.850 | 0.400 | | | | |
| 761 | IR cut filter | ∞ | 0.210 | 1.517 | 64.167 | | plastic |
| 762 | | ∞ | 0.292 | | | | |
| 770 | Image plane | ∞ | | | | | |

FIG. 32

| Aspherical parameters | | | | | |
|---|---|---|---|---|---|
| Surface # | K | A2 | A4 | A6 | A8 |
| 711 | 1.672907E+03 | 0.000000E+00 | 2.009124E-01 | -3.722276E-01 | 4.206856E-01 |
| 712 | -7.493085E-01 | 0.000000E+00 | -2.349854E-01 | 2.443673E-01 | -4.241274E+00 |
| 721 | -7.832300E+00 | 0.000000E+00 | 9.832844E-01 | -3.319382E+00 | 2.682458E+00 |
| 722 | 1.188415E+01 | 0.000000E+00 | 2.899644E-01 | 3.935529E+00 | -8.301875E+00 |
| 731 | 1.566528E+01 | 0.000000E+00 | 1.594393E-01 | 3.812248E+00 | -6.490637E+01 |
| 732 | -6.862261E+00 | 0.000000E+00 | 4.013870E-01 | -1.403730E+01 | 6.351847E+01 |
| 741 | -5.769643E+00 | 0.000000E+00 | 2.913603E-01 | -5.264371E+00 | -1.885547E+00 |
| 742 | -7.711698E+00 | 0.000000E+00 | -8.836510E-01 | 2.539654E+00 | -3.015343E+00 |
| 751 | -1.490075E+01 | 0.000000E+00 | -2.043122E-01 | 1.690061E-01 | -6.879388E-02 |
| 752 | -4.326539E+00 | 0.000000E+00 | -6.887534E-02 | -9.827392E-04 | 1.185793E-02 |
| Surface # | A10 | A12 | A14 | A16 | |
| 711 | -2.242074E-01 | 3.332514E-02 | 1.430248E-02 | -4.395251E-03 | |
| 712 | 8.447384E+00 | 8.359680E+00 | -1.774902E+01 | -1.589449E+00 | |
| 721 | 2.324762E+01 | -3.837101E+01 | 0.000000E+00 | 0.000000E+00 | |
| 722 | 1.477804E+02 | -5.856736E+02 | 0.000000E+00 | 0.000000E+00 | |
| 731 | 6.723293E+02 | -4.693103E+03 | 3.043340E+04 | -1.229679E+05 | |
| 732 | -2.861627E+02 | 8.883442E+02 | -1.580462E+03 | 1.652208E+03 | |
| 741 | 1.740234E+01 | -5.704810E+01 | 1.861450E+02 | -8.058641E-01 | |
| 742 | -6.902369E-01 | 5.582597E+00 | -3.579197E+00 | -1.977933E-01 | |
| 751 | 4.610879E-03 | 2.126865E-03 | -2.087581E-03 | 1.935025E-03 | |
| 752 | -2.853712E-03 | -9.126247E-04 | 3.273325E-04 | -2.425172E-05 | |

FIG. 33

| Effective focal length (EFL) = 1.009 mm, HFOV (Half field of view) = 55.508 deg., TTL = 3.666 mm, Image height = 1.815 mm, Fno = 2.338 |||||||
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 811 | 1st lens element | 33.207 | 0.190 | 1.545 | 55.987 | -1.325 | plastic |
| 812 | | 0.707 | 0.208 | | | | |
| 821 | 2nd lens element | 0.816 | 0.460 | 1.642 | 22.409 | 1.979 | plastic |
| 822 | | 1.751 | 0.114 | | | | |
| 800 | Aperture stop | 0.000 | -0.018 | | | | |
| 831 | 3rd lens element | 1.911 | 1.089 | 1.545 | 55.987 | 0.732 | plastic |
| 832 | | -0.404 | 0.033 | | | | |
| 841 | 4th lens element | -0.333 | 0.205 | 1.642 | 22.409 | -0.768 | plastic |
| 842 | | -1.255 | 0.089 | | | | |
| 851 | 5th lens element | 0.500 | 0.636 | 1.535 | 55.712 | 1.233 | plastic |
| 852 | | 1.141 | 0.340 | | | | |
| 861 | IR cut filter | ∞ | 0.210 | 1.517 | 64.167 | | plastic |
| 862 | | ∞ | 0.111 | | | | |
| 870 | Image plane | ∞ | | | | | |

FIG. 36

| Aspherical parameters | | | | | |
|---|---|---|---|---|---|
| Surface # | K | A2 | A4 | A6 | A8 |
| 811 | 5.079808E+02 | 0.000000E+00 | 2.356801E-01 | -3.648085E-01 | 4.239988E-01 |
| 812 | -7.546056E-01 | 0.000000E+00 | -2.365246E-01 | 4.684373E-01 | -4.068575E+00 |
| 821 | -6.947394E+00 | 0.000000E+00 | 1.190884E+00 | -3.210613E+00 | 1.847100E+00 |
| 822 | 1.294627E+01 | 0.000000E+00 | 3.954810E-01 | 3.160159E+00 | -1.754917E+01 |
| 831 | 1.445045E+01 | 0.000000E+00 | 1.051075E-01 | 4.314532E+00 | -6.302243E+01 |
| 832 | -6.772303E+00 | 0.000000E+00 | 4.886808E-01 | -1.378035E+01 | 6.251837E+01 |
| 841 | -6.141610E+00 | 0.000000E+00 | 1.712476E-01 | -5.474602E+00 | -6.079584E-01 |
| 842 | -1.299309E+00 | 0.000000E+00 | -9.456507E-01 | 2.640974E+00 | -3.101689E+00 |
| 851 | -6.808134E+00 | 0.000000E+00 | -1.711340E-01 | 1.512434E-01 | -7.274774E-02 |
| 852 | -5.904350E+00 | 0.000000E+00 | -7.519465E-02 | 1.947120E-02 | -3.396629E-03 |
| Surface # | A10 | A12 | A14 | A16 | |
| 811 | -2.246784E-01 | 3.379570E-02 | 1.473388E-02 | -3.984160E-03 | |
| 812 | 8.208362E+00 | 7.564614E+00 | -1.937396E+01 | 2.318299E+00 | |
| 821 | 2.355584E+01 | -4.052673E+01 | 0.000000E+00 | 0.000000E+00 | |
| 822 | 1.281752E+02 | -5.598180E+02 | 0.000000E+00 | 0.000000E+00 | |
| 831 | 6.510560E+02 | -4.966068E+03 | 2.807078E+04 | -8.883683E+04 | |
| 832 | -2.880458E+02 | 8.881081E+02 | -1.587682E+03 | 1.442244E+03 | |
| 841 | 1.639511E+01 | -6.951146E+01 | 1.626175E+02 | 2.119218E+01 | |
| 842 | -4.550900E-01 | 5.713036E+00 | -3.690205E+00 | -2.199747E-01 | |
| 851 | 7.724958E-03 | 5.287110E-03 | -1.420859E-03 | 5.481988E-05 | |
| 852 | -2.063579E-03 | 9.610425E-05 | 4.292233E-04 | -8.417574E-05 | |

FIG. 37

| Effective focal length (EFL) = 1.039 mm, HFOV (Half field of view) = 55.484 deg., TTL = 3.559 mm, Image height = 1.815 mm, Fno = 2.311 | | | | | | | |
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 911 | 1st lens element | 34.019 | 0.330 | 1.545 | 55.987 | -1.353 | plastic |
| 912 | | 0.721 | 0.250 | | | | |
| 921 | 2nd lens element | 0.856 | 0.258 | 1.642 | 22.409 | 2.884 | plastic |
| 922 | | 1.395 | 0.184 | | | | |
| 900 | Aperture stop | 0.000 | -0.015 | | | | |
| 931 | 3rd lens element | 1.864 | 0.636 | 1.545 | 55.987 | 0.783 | plastic |
| 932 | | -0.488 | 0.173 | | | | |
| 941 | 4th lens element | -0.353 | 0.275 | 1.642 | 22.409 | -0.868 | plastic |
| 942 | | -1.240 | 0.150 | | | | |
| 951 | 5th lens element | 0.537 | 0.619 | 1.535 | 55.712 | 1.231 | plastic |
| 952 | | 1.719 | 0.400 | | | | |
| 961 | IR cut filter | ∞ | 0.210 | 1.517 | 64.167 | | plastic |
| 962 | | ∞ | 0.090 | | | | |
| 970 | Image plane | ∞ | | | | | |

FIG. 40

| Aspherical parameters | | | | | |
|---|---|---|---|---|---|
| Surface # | K | A2 | A4 | A6 | A8 |
| 911 | 1.711065E+02 | 0.000000E+00 | 2.256780E-01 | -3.887866E-01 | 4.148489E-01 |
| 912 | -9.135684E-01 | 0.000000E+00 | -3.084885E-01 | 1.872970E-01 | -4.290017E+00 |
| 921 | -7.322397E+00 | 0.000000E+00 | 9.097082E-01 | -4.021795E+00 | 3.121066E+00 |
| 922 | 5.310386E+00 | 0.000000E+00 | 8.802939E-02 | 3.309089E+00 | -3.019285E+01 |
| 931 | 6.405076E+00 | 0.000000E+00 | 1.628300E-01 | 4.664761E-01 | -6.650180E+01 |
| 932 | -3.810633E+00 | 0.000000E+00 | 2.570775E-01 | -1.228675E+01 | 6.529190E+01 |
| 941 | -5.434866E+00 | 0.000000E+00 | 1.468107E-01 | -2.781929E+00 | -8.337724E-01 |
| 942 | -5.242732E+01 | 0.000000E+00 | -7.386196E-01 | 2.341820E+00 | -3.261689E+00 |
| 951 | -3.600111E+00 | 0.000000E+00 | -1.694960E-01 | 1.238813E-01 | -7.462567E-02 |
| 952 | -7.344626E+00 | 0.000000E+00 | -3.759959E-03 | -2.984098E-03 | 6.650875E-03 |
| Surface # | A10 | A12 | A14 | A16 | |
| 911 | -2.163813E-01 | 4.010125E-02 | 1.546296E-02 | -7.133841E-03 | |
| 912 | 8.963631E+00 | 8.359038E+00 | -2.049274E+01 | -1.537433E+00 | |
| 921 | 2.424593E+01 | -6.576874E+01 | 0.000000E+00 | 0.000000E+00 | |
| 922 | 1.578349E+02 | -5.517347E+02 | 0.000000E+00 | 0.000000E+00 | |
| 931 | 6.842211E+02 | -5.031322E+03 | 2.647972E+04 | -1.001845E+05 | |
| 932 | -2.968873E+02 | 8.589062E+02 | -1.620907E+03 | 1.156285E+03 | |
| 941 | 1.660083E+00 | -8.969003E+01 | 1.354352E+02 | -7.108491E+02 | |
| 942 | -6.553038E-01 | 5.394601E+00 | -3.839094E+00 | 9.388501E-01 | |
| 951 | 1.762208E-02 | 6.869896E-03 | -3.917160E-03 | -6.159788E-04 | |
| 952 | -3.627917E-03 | -4.200619E-04 | 5.881395E-04 | -9.773541E-05 | |

FIG. 41

| Effective focal length (EFL) = 1.605 mm, HFOV (Half field of view) = 55.484 deg., TTL = 4.052 mm, Image height = 1.815 mm, Fno = 2.254 ||||||||
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 10'11 | 1st lens element | 3.586 | 0.317 | 1.545 | 55.987 | -1.463 | plastic |
| 10'12 | | 0.633 | 0.244 | | | | |
| 10'21 | 2nd lens element | 0.700 | 0.647 | 1.642 | 22.409 | 1.676 | plastic |
| 10'22 | | 1.254 | 0.084 | | | | |
| 10'00 | Aperture stop | 0.000 | -0.030 | | | | |
| 10'31 | 3rd lens element | 2.320 | 0.708 | 1.545 | 55.987 | 0.697 | plastic |
| 10'32 | | -0.406 | 0.049 | | | | |
| 10'41 | 4th lens element | -0.338 | 0.268 | 1.642 | 22.409 | -0.732 | plastic |
| 10'42 | | -1.555 | 0.218 | | | | |
| 10'51 | 5th lens element | 0.600 | 0.443 | 1.535 | 55.712 | 1.698 | plastic |
| 10'52 | | 1.301 | 0.500 | | | | |
| 10'61 | IR cut filter | ∞ | 0.210 | 1.517 | 64.167 | | plastic |
| 10'62 | | ∞ | 0.395 | | | | |
| 10'70 | Image plane | ∞ | | | | | |

FIG. 44

| Aspherical parameters | | | | | |
|---|---|---|---|---|---|
| Surface # | K | A2 | A4 | A6 | A8 |
| 10'11 | -1.103204E+02 | 0.000000E+00 | 1.944049E-01 | -3.861759E-01 | 4.307815E-01 |
| 10'12 | -5.389081E-01 | 0.000000E+00 | -2.310051E-01 | 3.410679E-02 | -4.168551E+00 |
| 10'21 | -5.810732E+00 | 0.000000E+00 | 1.242503E+00 | -3.329466E+00 | 2.157111E+00 |
| 10'22 | 1.760305E+00 | 0.000000E+00 | 3.997324E-02 | 2.835071E+00 | -1.074140E+01 |
| 10'31 | 8.158364E+00 | 0.000000E+00 | -4.006944E-02 | 3.574001E+00 | -6.118316E+01 |
| 10'32 | -6.509645E+00 | 0.000000E+00 | 4.131981E-01 | -1.436261E+01 | 6.537005E+01 |
| 10'41 | -6.548530E+00 | 0.000000E+00 | 2.703884E-01 | -5.522901E+00 | -2.377265E+00 |
| 10'42 | -6.856057E+00 | 0.000000E+00 | -8.394335E-01 | 2.515406E+00 | -3.156983E+00 |
| 10'51 | -7.737113E+00 | 0.000000E+00 | -1.996173E-01 | 1.802225E-01 | -8.099163E-02 |
| 10'52 | -5.809122E+00 | 0.000000E+00 | -8.192075E-02 | -3.743036E-03 | 1.267407E-02 |
| Surface # | A10 | A12 | A14 | A16 | |
| 10'11 | -2.273902E-01 | 3.400400E-02 | 1.424617E-02 | -4.438844E-03 | |
| 10'12 | 8.708567E+00 | 9.906816E+00 | -1.742575E+01 | -6.147565E+00 | |
| 10'21 | 2.414287E+01 | -3.800128E+01 | 0.000000E+00 | 0.000000E+00 | |
| 10'22 | 2.169052E+02 | -7.297029E+02 | 0.000000E+00 | 0.000000E+00 | |
| 10'31 | 6.731798E+02 | -4.627004E+03 | 3.003557E+04 | -1.079882E+05 | |
| 10'32 | -2.965755E+02 | 8.736940E+02 | -1.602597E+03 | 1.770175E+03 | |
| 10'41 | 1.915736E+01 | -5.318923E+01 | 1.852620E+02 | -7.015861E+01 | |
| 10'42 | -8.063243E-01 | 5.461841E+00 | -3.389500E+00 | 7.286345E-01 | |
| 10'51 | 7.420346E-03 | 6.039885E-03 | -1.355787E-03 | -8.504611E-05 | |
| 10'52 | -3.422860E-03 | -1.018918E-03 | 3.977567E-04 | -7.780747E-06 | |

FIG. 45

| Effective focal length (EFL) = 1.192 mm, HFOV (Half field of view) = 55.5 deg., TTL = 3.669 mm, Image height= 1.815 mm, Fno = 2.389 ||||||||
| --- | --- | --- | --- | --- | --- | --- | --- |
| Surface # | | Radius (mm) | Thickness (mm) | Refractive index | Abbe number | Focus (mm) | Material |
| - | Object | ∞ | ∞ | | | | |
| 11'11 | 1st lens element | 37.966 | 0.184 | 1.545 | 55.987 | -1.299 | plastic |
| 11'12 | | 0.695 | 0.202 | | | | |
| 11'21 | 2nd lens element | 0.778 | 0.452 | 1.642 | 22.409 | 1.806 | plastic |
| 11'22 | | 1.792 | 0.109 | | | | |
| 11'00 | Aperture stop | 0.000 | -0.018 | | | | |
| 11'31 | 3rd lens element | 2.821 | 0.688 | 1.545 | 55.987 | 0.767 | plastic |
| 11'32 | | -0.450 | 0.053 | | | | |
| 11'41 | 4th lens element | -0.341 | 0.275 | 1.642 | 22.409 | -0.740 | plastic |
| 11'42 | | -1.562 | 0.063 | | | | |
| 11'51 | 5th lens element | 0.536 | 0.792 | 1.535 | 55.712 | 1.158 | plastic |
| 11'52 | | 1.885 | 0.475 | | | | |
| 11'61 | IR cut filter | ∞ | 0.210 | 1.517 | 64.167 | | plastic |
| 11'62 | | ∞ | 0.184 | | | | |
| 11'70 | Image plane | ∞ | | | | | |

FIG. 48

| Aspherical parameters | | | | |
|---|---|---|---|---|
| Surface # | K | A2 | A4 | A6 | A8 |
| 11'11 | -9.666042E+00 | 0.000000E+00 | 2.336459E-01 | -3.686481E-01 | 4.262074E-01 |
| 11'12 | -6.423662E-01 | 0.000000E+00 | -3.635566E-01 | 5.392490E-01 | -4.668754E+00 |
| 11'21 | -6.200455E+00 | 0.000000E+00 | 1.096242E+00 | -3.545492E+00 | 2.286115E+00 |
| 11'22 | 4.800877E+00 | 0.000000E+00 | 5.218520E-01 | 2.947406E+00 | -1.359804E+01 |
| 11'31 | 1.046449E+01 | 0.000000E+00 | 1.345311E-01 | 6.125966E+00 | -7.851010E+01 |
| 11'32 | -7.014832E+00 | 0.000000E+00 | 6.051438E-01 | -1.603446E+01 | 6.507010E+01 |
| 11'41 | -6.275183E+00 | 0.000000E+00 | 5.262077E-01 | -6.899578E+00 | -6.542290E-01 |
| 11'42 | -7.727128E+00 | 0.000000E+00 | -8.923598E-01 | 2.433372E+00 | -2.616782E+00 |
| 11'51 | -8.380177E+00 | 0.000000E+00 | -1.665675E-01 | 1.496013E-01 | -6.778414E-02 |
| 11'52 | -6.062026E+00 | 0.000000E+00 | -3.914044E-02 | -5.917774E-03 | 1.473726E-02 |
| Surface # | A10 | A12 | A14 | A16 | |
| 11'11 | -2.239459E-01 | 3.325436E-02 | 1.419583E-02 | -4.511614E-03 | |
| 11'12 | 8.344370E+00 | 8.951348E+00 | -1.795596E+01 | -3.785227E-01 | |
| 11'21 | 2.464043E+01 | -3.976479E+01 | -7.040642E-02 | -2.529026E-01 | |
| 11'22 | 2.498020E+02 | -8.611711E+02 | 6.210424E+00 | 3.129794E+01 | |
| 11'31 | 6.970812E+02 | -4.663850E+03 | 3.019248E+04 | -1.105533E+05 | |
| 11'32 | -2.878753E+02 | 8.865455E+02 | -1.555567E+03 | 1.777469E+03 | |
| 11'41 | 1.909088E+01 | -5.061101E+01 | 1.953704E+02 | -5.305744E+01 | |
| 11'42 | -7.244900E-01 | 5.517110E+00 | -3.647680E+00 | -9.635484E-02 | |
| 11'51 | 6.878454E-03 | 5.703486E-03 | -1.265801E-03 | 5.473556E-06 | |
| 11'52 | -3.499339E-03 | -9.848057E-04 | 3.696257E-04 | -1.118803E-05 | |

FIG. 49

| \multicolumn{7}{c}{Effective focal length (EFL) = 1.334 mm, HFOV (Half field of view) = 55.777 deg., TTL = 3.606 mm, Image height= 1.815 mm, Fno = 2.326} |
|---|---|---|---|---|---|---|

| Surface # | | Radius (mm) | Thickness (mm) | Refractive index | Abbe number | Focus (mm) | Material |
|---|---|---|---|---|---|---|---|
| - | Object | ∞ | ∞ | | | | |
| 12'11 | 1st lens element | 15.103 | 0.279 | 1.545 | 55.987 | -1.421 | plastic |
| 12'12 | | 0.733 | 0.198 | | | | |
| 12'21 | 2nd lens element | 0.753 | 0.217 | 1.642 | 22.409 | 2.089 | plastic |
| 12'22 | | 1.507 | 0.125 | | | | |
| 12'00 | Aperture stop | 0.000 | -0.029 | | | | |
| 12'31 | 3rd lens element | 2.081 | 0.829 | 1.545 | 55.987 | 0.711 | plastic |
| 12'32 | | -0.410 | 0.039 | | | | |
| 12'41 | 4th lens element | -0.335 | 0.227 | 1.642 | 22.409 | -0.728 | plastic |
| 12'42 | | -1.474 | 0.132 | | | | |
| 12'51 | 5th lens element | 0.590 | 0.721 | 1.535 | 55.712 | 1.507 | plastic |
| 12'52 | | 1.251 | 0.500 | | | | |
| 12'61 | IR cut filter | ∞ | 0.210 | 1.517 | 64.167 | | plastic |
| 12'62 | | ∞ | 0.158 | | | | |
| 12'70 | Image plane | ∞ | | | | | |

FIG. 52

| Aspherical parameters | | | | | |
|---|---|---|---|---|---|
| Surface # | K | A2 | A4 | A6 | A8 |
| 12'11 | 1.567339E+02 | 0.000000E+00 | 2.224881E-01 | -3.693238E-01 | 4.167211E-01 |
| 12'12 | -5.286900E-01 | 0.000000E+00 | -3.237126E-02 | 9.902826E-02 | -4.506279E+00 |
| 12'21 | -6.068980E+00 | 0.000000E+00 | 1.478224E+00 | -2.559913E+00 | 6.703287E+00 |
| 12'22 | 9.085658E+00 | 0.000000E+00 | 4.759546E-01 | 3.456943E+00 | -5.152229E+00 |
| 12'31 | 1.491469E+01 | 0.000000E+00 | 1.144956E-01 | 4.187164E+00 | -6.142903E+01 |
| 12'32 | -7.101681E+00 | 0.000000E+00 | 2.919415E-01 | -1.384037E+01 | 6.398406E+01 |
| 12'41 | -5.805509E+00 | 0.000000E+00 | 2.871317E-01 | -5.221554E+00 | -1.902507E+00 |
| 12'42 | -9.729220E+00 | 0.000000E+00 | -8.026275E-01 | 2.658921E+00 | -3.141993E+00 |
| 12'51 | -6.783611E+00 | 0.000000E+00 | -2.108728E-01 | 1.795628E-01 | -8.106825E-02 |
| 12'52 | -6.615980E+00 | 0.000000E+00 | -4.809168E-02 | -5.583694E-04 | 1.325058E-02 |
| Surface # | A10 | A12 | A14 | A16 | |
| 12'11 | -2.266107E-01 | 3.264859E-02 | 1.461793E-02 | -6.295735E-03 | |
| 12'12 | 1.131589E+01 | 1.844477E+01 | -1.755765E+01 | -7.087025E+01 | |
| 12'21 | 3.939950E+01 | -1.294842E+01 | -4.954704E+00 | -1.488178E+02 | |
| 12'22 | 2.562334E+02 | -8.722979E+02 | 3.358042E+02 | 8.102670E+03 | |
| 12'31 | 6.760098E+02 | -4.780822E+03 | 3.011900E+04 | -1.045885E+05 | |
| 12'32 | -2.882592E+02 | 8.828683E+02 | -1.560465E+03 | 1.838650E+03 | |
| 12'41 | 1.946245E+01 | -5.050591E+01 | 1.892832E+02 | -1.128847E+02 | |
| 12'42 | -6.793776E-01 | 5.510719E+00 | -3.781674E+00 | -3.079335E-01 | |
| 12'51 | 6.811759E-03 | 5.645599E-03 | -1.205441E-03 | 1.507078E-04 | |
| 12'52 | -3.471595E-03 | -9.811841E-04 | 3.561264E-04 | -1.904941E-05 | |

FIG. 53

| Embodiment | 1st | 2nd | 3rd | 4th | 5th | 6th |
|---|---|---|---|---|---|---|
| T1 | 0.377 | 0.454 | 0.241 | 0.250 | 0.249 | 0.246 |
| G12 | 0.320 | 0.246 | 0.276 | 0.338 | 0.249 | 0.392 |
| T2 | 0.474 | 0.455 | 0.460 | 0.495 | 0.462 | 0.468 |
| G23 | 0.078 | 0.032 | 0.093 | 0.097 | 0.053 | 0.045 |
| T3 | 0.732 | 0.753 | 0.659 | 0.733 | 0.718 | 0.755 |
| G34 | 0.060 | 0.055 | 0.048 | 0.052 | 0.046 | 0.095 |
| T4 | 0.237 | 0.272 | 0.335 | 0.401 | 0.363 | 0.378 |
| G45 | 0.181 | 0.154 | 0.060 | 0.074 | 0.195 | 0.015 |
| T5 | 0.546 | 0.636 | 0.519 | 0.562 | 0.656 | 0.453 |
| G5 | 0.400 | 0.500 | 0.500 | 0.400 | 0.500 | 0.400 |
| TF | 0.210 | 0.210 | 0.210 | 0.210 | 0.210 | 0.210 |
| GFP | 0.331 | 0.212 | 0.584 | 0.089 | 0.140 | 0.090 |
| BFL | 0.941 | 0.922 | 1.294 | 0.699 | 0.850 | 0.700 |
| ALT | 2.365 | 2.570 | 2.214 | 2.440 | 2.449 | 2.301 |
| AAG | 0.639 | 0.486 | 0.477 | 0.561 | 0.543 | 0.547 |
| TTL | 3.946 | 3.978 | 3.985 | 3.700 | 3.841 | 3.548 |
| TL | 3.005 | 3.056 | 2.690 | 3.001 | 2.991 | 2.848 |
| AAG/T2 | 1.350 | 1.070 | 1.035 | 1.133 | 1.174 | 1.169 |
| V2 | 22.409 | 22.409 | 22.409 | 22.409 | 22.409 | 22.409 |
| V1-V2 | 33.578 | 33.578 | 33.578 | 33.578 | 33.578 | 33.578 |
| V1 | 55.987 | 55.987 | 55.987 | 55.987 | 55.987 | 55.987 |
| EFL/T5 | 2.205 | 2.101 | 2.575 | 1.416 | 1.932 | 2.186 |
| (T1+T2)/T4 | 3.591 | 3.348 | 2.094 | 1.859 | 1.959 | 1.888 |
| (T1+T3)/T5 | 2.031 | 1.897 | 1.734 | 1.751 | 1.474 | 2.209 |
| (T1+G23+G45)/G12 | 1.991 | 2.600 | 1.426 | 1.245 | 1.991 | 0.781 |
| (T1+G34+G45)/G12 | 1.934 | 2.695 | 1.264 | 1.112 | 1.962 | 0.909 |
| (T1+G12+G23)/(T4+G45) | 1.854 | 1.722 | 1.541 | 1.444 | 0.988 | 1.738 |
| (T1+G12+G34)/(T4+G45) | 1.810 | 1.777 | 1.427 | 1.350 | 0.975 | 1.865 |
| EFL/T4 | 5.079 | 4.924 | 3.992 | 1.985 | 3.494 | 2.620 |
| (T1+G12)/T2 | 1.472 | 1.541 | 1.122 | 1.187 | 1.078 | 1.365 |
| (T1+G12)/T4 | 2.942 | 2.579 | 1.543 | 1.467 | 1.373 | 1.688 |
| BFL/T3 | 1.286 | 1.226 | 1.963 | 0.953 | 1.183 | 0.927 |
| BFL/T5 | 1.724 | 1.450 | 2.494 | 1.244 | 1.295 | 1.544 |
| AAG/T1 | 1.694 | 1.070 | 1.981 | 2.245 | 2.180 | 2.220 |
| AAG/T4 | 2.697 | 1.791 | 1.423 | 1.400 | 1.495 | 1.446 |
| TTL/ALT | 1.668 | 1.548 | 1.800 | 1.516 | 1.569 | 1.542 |
| TL/(T2+T3+T4+T5) | 1.511 | 1.445 | 1.363 | 1.370 | 1.360 | 1.386 |

FIG. 54A

| Embodiment | 7th | 8th | 9th | 10th | 11th | 12th |
|---|---|---|---|---|---|---|
| T1 | 0.279 | 0.190 | 0.330 | 0.317 | 0.184 | 0.243 |
| G12 | 0.256 | 0.208 | 0.250 | 0.244 | 0.202 | 0.204 |
| T2 | 0.467 | 0.460 | 0.258 | 0.647 | 0.452 | 0.205 |
| G23 | 0.069 | 0.096 | 0.169 | 0.053 | 0.090 | 0.107 |
| T3 | 0.898 | 1.089 | 0.636 | 0.708 | 0.688 | 0.806 |
| G34 | 0.049 | 0.033 | 0.173 | 0.049 | 0.053 | 0.055 |
| T4 | 0.255 | 0.205 | 0.275 | 0.268 | 0.275 | 0.234 |
| G45 | 0.005 | 0.089 | 0.150 | 0.218 | 0.063 | 0.156 |
| T5 | 0.807 | 0.636 | 0.619 | 0.443 | 0.792 | 0.706 |
| G5 | 0.400 | 0.340 | 0.400 | 0.500 | 0.475 | 0.500 |
| TF | 0.210 | 0.210 | 0.210 | 0.210 | 0.210 | 0.210 |
| GFP | 0.292 | 0.111 | 0.090 | 0.395 | 0.184 | 0.391 |
| BFL | 0.902 | 0.661 | 0.700 | 1.105 | 0.869 | 0.868 |
| ALT | 2.706 | 2.579 | 2.117 | 2.382 | 2.391 | 2.273 |
| AAG | 0.379 | 0.426 | 0.742 | 0.565 | 0.409 | 0.465 |
| TTL | 3.987 | 3.666 | 3.559 | 4.052 | 3.669 | 3.606 |
| TL | 3.085 | 3.005 | 2.859 | 2.947 | 2.800 | 2.738 |
| AAG/T2 | 0.811 | 0.925 | 2.880 | 0.873 | 0.905 | 2.148 |
| V2 | 30.973 | 22.409 | 22.409 | 22.409 | 22.409 | 22.409 |
| V1-V2 | 28.735 | 33.578 | 33.578 | 33.578 | 33.578 | 33.578 |
| V1 | 59.709 | 55.987 | 55.987 | 55.987 | 55.987 | 55.987 |
| EFL/T5 | 1.379 | 1.588 | 1.679 | 3.625 | 1.506 | 1.854 |
| (T1+T2)/T4 | 2.924 | 3.176 | 2.137 | 3.595 | 2.317 | 2.183 |
| (T1+T3)/T5 | 1.458 | 2.011 | 1.560 | 2.313 | 1.102 | 1.537 |
| (T1+G23+G45)/G12 | 1.383 | 1.803 | 2.600 | 2.410 | 1.666 | 2.555 |
| (T1+G34+G45)/G12 | 1.302 | 1.501 | 2.614 | 2.393 | 1.484 | 2.267 |
| (T1+G12+G23)/(T4+G45) | 2.322 | 1.680 | 1.762 | 1.263 | 1.413 | 1.599 |
| (T1+G12+G34)/(T4+G45) | 2.242 | 1.466 | 1.770 | 1.255 | 1.304 | 1.440 |
| EFL/T4 | 4.364 | 4.931 | 3.780 | 5.988 | 4.343 | 5.884 |
| (T1+G12)/T2 | 1.145 | 0.863 | 2.250 | 0.867 | 0.855 | 2.205 |
| (T1+G12)/T4 | 2.095 | 1.941 | 2.109 | 2.092 | 1.408 | 2.103 |
| BFL/T3 | 1.005 | 0.608 | 1.100 | 1.562 | 1.263 | 1.047 |
| BFL/T5 | 1.118 | 1.040 | 1.130 | 2.497 | 1.098 | 1.205 |
| AAG/T1 | 1.357 | 2.245 | 2.249 | 1.783 | 2.221 | 1.667 |
| AAG/T4 | 1.484 | 2.080 | 2.699 | 2.107 | 1.490 | 2.048 |
| TTL/ALT | 1.473 | 1.422 | 1.681 | 1.701 | 1.535 | 1.587 |
| TL/(T2+T3+T4+T5) | 1.271 | 1.258 | 1.600 | 1.427 | 1.269 | 1.373 |

FIG. 54B

OPTICAL LENS ASSEMBLY

CROSS-REFERENCE TO RELATED APPLICATION

This application claims priority to P.R.C. Patent Application No. 201710097277.4 titled "Optical Lens Assembly," filed Feb. 22, 2017, with the State Intellectual Property Office of the People's Republic of China ("SIPO"), the contents of which are incorporated by reference herein in their entirety.

TECHNICAL FIELD

The present disclosure relates to an optical lens assembly, and particularly, to an optical lens assembly having five lens elements.

BACKGROUND

Mobile electronic device technology improves every day and consumer demands for compact electronic devices have not decreased. Accordingly, key components of an optical lens assembly for a consumer electronic product should keep pace with technological improvements in order to meet expectations of consumers. Other than good imaging quality and small size of an optical lens assembly, the optical lens assembly should also have a larger field of view.

In this manner, there is a need for increasing field of view while maintaining good imaging quality and small size.

SUMMARY

The present disclosure provides for an optical lens assembly. By designing the convex and/or concave surfaces of the five lens elements, the length of the optical lens assembly may be shortened while maintaining good optical characteristics and imaging quality.

In the present disclosure, parameters used herein may be chosen from but not limited to parameters listed below:

| Parameter | Definition |
| --- | --- |
| T1 | The central thickness of the first lens element along the optical axis |
| G12 | The air gap between the first lens element and the second lens element along the optical axis |
| T2 | The central thickness of the second lens element along the optical axis |
| G23 | The air gap between the second lens element and the third lens element along the optical axis |
| T3 | The central thickness of the third lens element along the optical axis |
| G34 | The air gap between the third lens element and the fourth lens element along the optical axis |
| T4 | The central thickness of the fourth lens element along the optical axis |
| G45 | The air gap between the fourth lens element and the fifth lens element along the optical axis |
| T5 | The central thickness of the fifth lens element along the optical axis |
| G5F | The air gap between the fifth lens element and the filtering unit along the optical axis |
| TF | The central thickness of the filtering unit along the optical axis |
| GFP | The air gap between the filtering unit and an image plane along the optical axis |
| f1 | The focusing length of the first lens element |
| f2 | The focusing length of the second lens element |
| f3 | The focusing length of the third lens element |
| f4 | The focusing length of the fourth lens element |
| f5 | The focusing length of the fifth lens element |
| n1 | The refracting index of the first lens element |
| n2 | The refracting index of the second lens element |
| n3 | The refracting index of the third lens element |
| n4 | The refracting index of the fourth lens element |
| n5 | The refracting index of the fifth lens element |
| v1 | The Abbe number of the first lens element |
| v2 | The Abbe number of the second lens element |
| v3 | The Abbe number of the third lens element |
| v4 | The Abbe number of the fourth lens element |
| v5 | The Abbe number of the fifth lens element |
| HFOV | Half Field of View of the optical lens assembly |
| Fno | F-number of the optical lens assembly |
| EFL | The effective focal length of the optical lens assembly |
| TTL | The distance from the object-side surface of the first lens element to an image plane along the optical axis |
| ALT | The sum of the central thicknesses from the first lens element to the fifth lens element |
| AAG | The sum of all air gaps from the first lens element to the fifth lens element along the optical axis |
| BFL | The back focal length of the optical lens assembly/The distance from the image-side surface of the fifth lens element to the image plane along the optical axis |
| TL | The distance from the object-side surface of the first lens element to the image-side surface of the fifth lens element along the optical axis |

In the first embodiment, an optical lens assembly may comprise sequentially from an object side to an image side along an optical axis, a first, second, third, fourth, and fifth lens elements. Each of the first, second, third, fourth, and fifth lens elements have varying refracting power in some embodiments. Additionally, each of the first to fifth lens elements may comprise an object-side surface facing toward the object side, an image-side surface facing toward the image side, and a central thickness defined along the optical axis. Moreover, the first lens element may have a negative refracting power and its object-side surface may comprise a convex portion in a vicinity of the optical axis, the fourth lens element may have negative refracting power, the image-side surface of the fifth lens element may comprise a concave portion in a vicinity of the optical axis, and the optical lens assembly may satisfy inequalities as follows:

$AAG/T2 \leq 2.9$   Inequality (1); and $V2 \leq 32$   Inequality (2)

Moreover, the above first embodiment of the optical lens assembly may comprise no other lenses having refracting power beyond the five lens elements. while it may satisfy any one of inequalities as follows:

$V1-V2 \geq 20$   Inequality (3)

$V1 \geq 50$   Inequality (4)

$EFL/T5 \leq 4$   Inequality (5)

$(T1+T2)/T4 \leq 3.6$   Inequality (6)

$(T1+G23+G45)/G12 \leq 2.61$   Inequality (7)

$(T1+G12+G23)/(T4+G45) \leq 2.6$   Inequality (8)

$BFL/T3 \leq 2$   Inequality (9)

$AAG/T1 \leq 2.25$   Inequality (10)

$TTL/ALT \leq 1.8$   Inequality (11)

$EFL/T4 \leq 6$   Inequality (12)

$(T1+T3)/T5 \leq 2.5$   Inequality (13)

$(T1+G34+G45)/G12 \leq 2.9$   Inequality (14)

$(T1+G12+G34)/(T4+G45) \leq 2.5$   Inequality (15)

$(T1+G12)/T2 \leq 2.25$   Inequality (16)

$(T1+G12)/T4 \leq 3.5$   Inequality (17)

$BFL/T5 \leq 2.5$   Inequality (18)

$AAG/T4 \leq 2.7$   Inequality (19); and $TTL/(T2+T3+T4+T5) \leq 1.6$   Inequality (20)

In the second embodiment, an optical lens assembly may comprise sequentially from an object side to an image side along an optical axis, a first, second, third, fourth, and fifth lens elements. Each of the first, second, third, fourth, and fifth lens elements may have varying refracting power in some embodiments. Additionally, each of the first to fifth lens elements may comprise an object-side surface facing toward the object side, an image-side surface facing toward the image side, and a central thickness defined along the optical axis. Moreover, the refracting power of the first lens element may be negative and its object-side surface may comprise a convex portion in a vicinity of a periphery of the first lens element, the image-side surface of the second lens element may comprise a concave portion in a vicinity of the optical axis, the refracting power of the fourth lens element may be negative, the image-side surface of the fifth lens element may comprise a concave portion in a vicinity of the optical axis, and the optical lens assembly may satisfy inequalities as follows:

$AAG/T2 \leq 2.2$   Inequality (21)

Moreover, the above second embodiment of the optical lens assembly may comprise no other lenses having refracting power beyond the five lens elements. while it may satisfy any one of inequalities as follows:

$V1-V2 \geq 20$   Inequality (3)

$V \geq 50$   Inequality (4)

$EFL/T5 \leq 4$   Inequality (5)

$(T1+T2)/T4 \leq 3.6$   Inequality (6)

$(T1+G23+G45)/G12 \leq 2.61$   Inequality (7)

$(T1+G12+G23)/(T4+G45) \leq 2.6$   Inequality (8)

$BFL/T3 \leq 2$   Inequality (9)

$AAG/T1 \leq 2.25$   Inequality (10)

$TTL/ALT \leq 1.8$   Inequality (11)

$EFL/T4 \leq 6$   Inequality (12)

$(T1+T3)/T5 \leq 2.5$   Inequality (13)

$(T1+G34+G45)/G12 \leq 2.9$   Inequality (14)

$(T1+G12+G34)/(T4+G45) \leq 2.5$   Inequality (15)

$(T1+G12)/T2 \leq 2.25$   Inequality (16)

$(T1+G12)/T4 \leq 3.5$   Inequality (17)

$BFL/T5 \leq 2.5$   Inequality (18)

$AAG/T4 \leq 2.7$   Inequality (19); and $TTL/(T2+T3+T4+T5) \leq 1.6$   Inequality (20)

BRIEF DESCRIPTION OF THE DRAWINGS

Exemplary embodiments will be more readily understood from the following detailed description when read in conjunction with the appended drawing, in which:

FIG. 1 depicts a cross-sectional view of one single lens element according to the present disclosure;

FIG. 2 depicts a schematic view of the relation between the surface shape and the optical focus of the lens element;

FIG. 8 depicts a table of optical data for each lens element of the optical lens assembly of a first embodiment of the present disclosure;

FIG. 9 depicts a table of aspherical data of a first embodiment of the optical lens assembly according to the present disclosure;

FIG. 12 depicts a table of optical data for each lens element of the optical lens assembly of a second embodiment of the present disclosure;

FIG. 13 depicts a table of aspherical data of a second embodiment of the optical lens assembly according to the present disclosure;

FIG. 16 depicts a table of optical data for each lens element of the optical lens assembly of a third embodiment of the present disclosure;

FIG. 17 depicts a table of aspherical data of a third embodiment of the optical lens assembly according to the present disclosure;

FIG. 20 depicts a table of optical data for each lens element of the optical lens assembly of a fourth embodiment of the present disclosure;

FIG. 21 depicts a table of aspherical data of a fourth embodiment of the optical lens assembly according to the present disclosure;

FIG. 24 depicts a table of optical data for each lens element of the optical lens assembly of a fifth embodiment of the present disclosure;

FIG. 25 depicts a table of aspherical data of a fifth embodiment of the optical lens assembly according to the present disclosure;

FIG. 28 depicts a table of optical data for each lens element of a sixth embodiment of an optical lens assembly according to the present disclosure;

FIG. 29 depicts a table of aspherical data of a sixth embodiment of the optical lens assembly according to the present disclosure;

FIG. 32 depicts a table of optical data for each lens element of the optical lens assembly of a seventh embodiment of the present disclosure;

FIG. 33 depicts a table of aspherical data of a seventh embodiment of the optical lens assembly according to the present disclosure;

FIG. 36 depicts a table of optical data for each lens element of the optical lens assembly of an eighth embodiment of the present disclosure;

FIG. 37 depicts a table of aspherical data of an eighth embodiment of the optical lens assembly according to the present disclosure;

FIG. 40 depicts a table of optical data for each lens element of the optical lens assembly of a ninth embodiment of the present disclosure;

FIG. 41 depicts a table of aspherical data of a ninth embodiment of the optical lens assembly according to the present disclosure;

FIG. 44 depicts a table of optical data for each lens element of the optical lens assembly of a tenth embodiment of the present disclosure;

FIG. 45 depicts a table of aspherical data of a tenth embodiment of the optical lens assembly according to the present disclosure;

FIG. 48 depicts a table of optical data for each lens element of the optical lens assembly of a eleventh embodiment of the present disclosure;

FIG. 49 depicts a table of aspherical data of a eleventh embodiment of the optical lens assembly according to the present disclosure;

FIG. 52 depicts a table of optical data for each lens element of the optical lens assembly of a twelfth embodiment of the present disclosure;

FIG. 53 depicts a table of aspherical data of a twelfth embodiment of the optical lens assembly according to the present disclosure;

FIGS. 54A and 54B are tables for values of T1, G12, T2, G23, T3, G34, T4, G45, T5, G5F, TF, GFP, BFL, ALT, AAG, TTL, TL, AAG/T2, V2, V1-V2, V1, EFL/T5, (T1+T2)/T4, (T1+T3)/T5, (T1+G23+G45)/G12,(T1+G34+G45)/G12, (T1+G12+G23)/(T4+G45),(T1+G12+G34)/(T4+G45), EFL/T4, (T1+G12)/T2, (T1+G12)/T4, BFL/T3, BFL/T5, AAG/T1, AAG/T4, TTL/ALT and TTL/(T2+T3+T4+T5) of the all twelve example embodiments.

DETAILED DESCRIPTION

Figure 3:
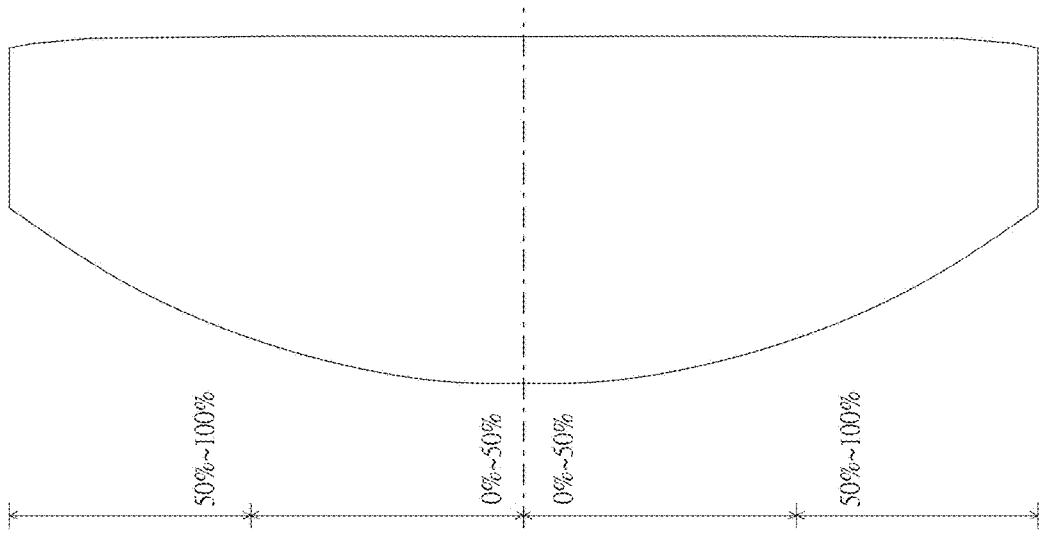
FIG. 3 depicts a schematic view of a first example of the surface shape and the effective radius of the lens element.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

In the present disclosure, the description "a lens element having positive refracting power (or negative refracting power)" means that the paraxial refracting power of the lens element in Gaussian optics is positive (or negative). The description "An object-side (or image-side) surface of a lens element" may include a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element may be rotationally symmetric, where the optical axis I is the axis of symmetry. The region A of the lens element is defined as "a part in a vicinity of the optical axis", and the region C of the lens element is defined as "a part in a vicinity of a periphery of the lens element". Besides, the lens element may also have an extending part E extended radially and outwardly from the region C, namely the part outside of the clear aperture of the lens element. The extending part E may be used for physically assembling the lens element into an optical lens assembly system. Under normal circumstances, the imaging rays would not pass through the extending part E because those imaging rays only pass through the clear aperture. The structures and shapes of the aforementioned extending part E are only examples for technical explanation, the structures and shapes of lens elements should not be limited to these examples. Note that the extending parts of the lens element surfaces depicted in the following embodiments are partially omitted.

The following criteria are provided for determining the shapes and the parts of lens element surfaces set forth in the present disclosure. These criteria mainly determine the boundaries of parts under various circumstances including the part in a vicinity of the optical axis, the part in a vicinity of a periphery of a lens element surface, and other types of lens element surfaces such as those having multiple parts.

FIG. 1 depicts a radial cross-sectional view of a lens element. Before determining boundaries of those aforementioned portions, two referential points should be defined first, the central point and the transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

Referring to FIG. 2, determining whether the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point may have a convex shape, the portion located radially outside of the first transition point may have a concave shape, and the first transition point is the point where the portion having a convex shape changes to the portion having a concave shape, namely the border of two adjacent portions. Alternatively, there is another method to determine whether a portion in a vicinity of the optical axis may have a convex or concave shape by referring to the sign of an "R" value, which is the (paraxial) radius of curvature of a lens surface. The R value may be used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent with the result found using the other way mentioned above, which determines surface shapes by referring to whether the focal point of a collimated ray is at the object side or the image side.

For none transition point cases, the portion in a vicinity of the optical axis may be defined as the portion between 0-50% of the effective radius (radius of the clear aperture) of the surface, whereas the portion in a vicinity of a periphery of the lens element may be defined as the portion between 50-100% of effective radius (radius of the clear aperture) of the surface.

Referring to the first example depicted in FIG. 3, only one transition point, namely a first transition point, appears within the clear aperture of the image-side surface of the lens element. Portion I may be a portion in a vicinity of the optical axis, and portion II may be a portion in a vicinity of a periphery of the lens element. The portion in a vicinity of the optical axis may be determined as having a concave surface due to the R value at the image-side surface of the lens element is positive. The shape of the portion in a vicinity of a periphery of the lens element may be different from that of the radially inner adjacent portion, i.e. the shape of the portion in a vicinity of a periphery of the lens element may be different from the shape of the portion in a vicinity of the optical axis; the portion in a vicinity of a periphery of the lens element may have a convex shape.

Figure 4:
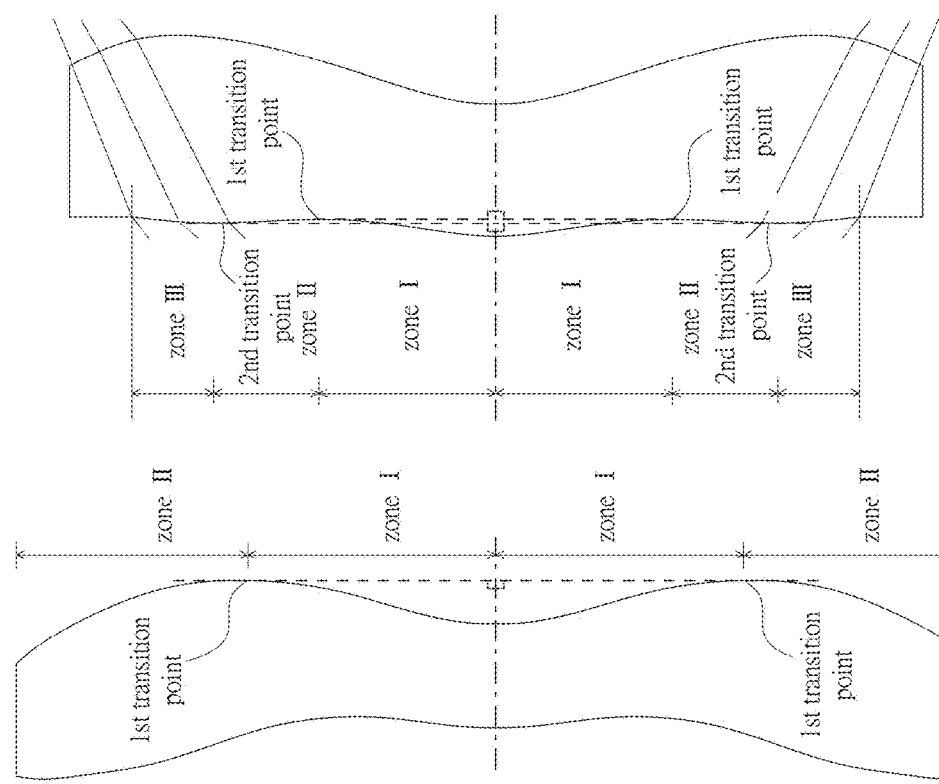
FIG. 4 depicts a schematic view of a second example of the surface shape and the effective radius of the lens element.

Referring to the second example depicted in FIG. 4, a first transition point and a second transition point may exist on the object-side surface (within the clear aperture) of a lens element. In which Here, portion I may be the portion in a vicinity of the optical axis, and portion III may be the portion in a vicinity of a periphery of the lens element. The portion in a vicinity of the optical axis may have a convex shape because the R value at the object-side surface of the lens element may be positive. The portion in a vicinity of a periphery of the lens element (portion III) may have a convex shape. What is more, there may be another portion having a concave shape existing between the first and second transition point (portion II).

Figure 5:
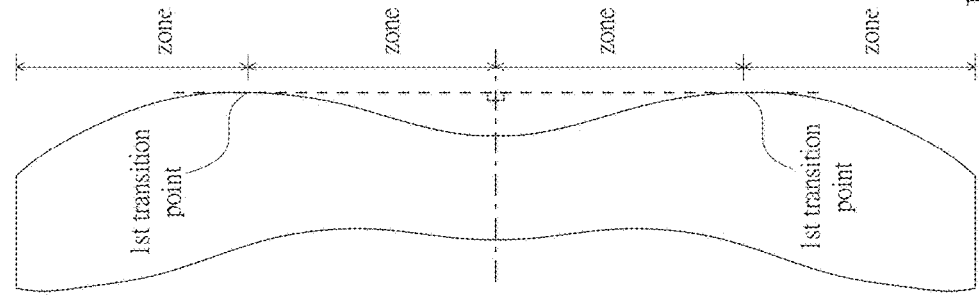
FIG. 5 depicts a schematic view of a third example of the surface shape and the effective radius of the lens element.

Referring to a third example depicted in FIG. 5, no transition point may exist on the object-side surface of the lens element. In this case, the portion between 0-50% of the effective radius (radius of the clear aperture) may be determined as the portion in a vicinity of the optical axis, and the portion between 50-100% of the effective radius may be determined as the portion in a vicinity of a periphery of the lens element. The portion in a vicinity of the optical axis of the object-side surface of the lens element may be determined as having a convex shape due to its positive R value, and the portion in a vicinity of a periphery of the lens element may be determined as having a convex shape as well.

Figure 6:
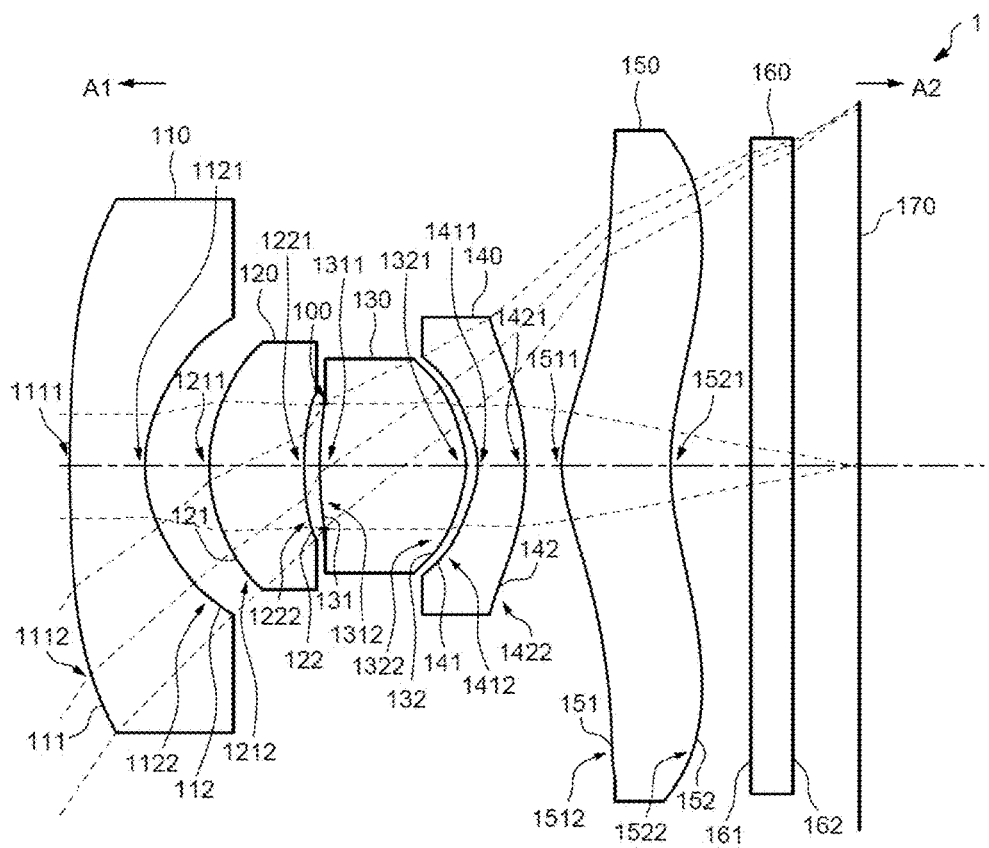
FIG. 6 depicts a cross-sectional view of a first embodiment of an optical lens assembly having seven lens elements according to the present disclosure.
Figure 7:
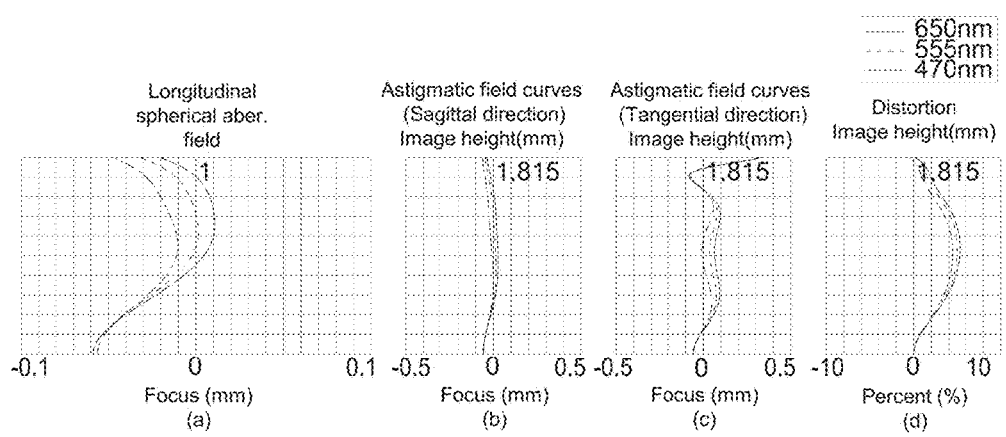
FIG. 7 depicts a chart of longitudinal spherical aberration and other kinds of optical aberrations of a first embodiment of the optical lens assembly according to the present disclosure.

Several exemplary embodiments and associated optical data will now be provided to illustrate non-limiting examples of optical lens assembly systems having good optical characteristics while increasing the field of view. Reference is now made to FIGS. 6-9. FIG. 6 illustrates an example cross-sectional view of an optical lens assembly 1 having five lens elements according to a first example embodiment. FIG. 7 shows example charts of longitudinal spherical aberration and other kinds of optical aberrations of the optical lens assembly 1 according to the first example embodiment. FIG. 8 illustrates an example table of optical data of each lens element of the optical lens assembly 1 according to the first example embodiment. FIG. 9 depicts an example table of aspherical data of the optical lens assembly 1 according to the first example embodiment.

As shown in FIG. 6, the optical lens assembly 1 of the present embodiment may comprise, in order from an object side A1 to an image side A2 along an optical axis, a first lens element 110, a second lens element 120, an aperture stop 100, a third lens element 130, a fourth lens element 140, and a fifth lens element 150. A filtering unit 160 and an image plane 170 of an image sensor (not shown) are positioned at the image side A2 of the optical lens assembly 1.

Each of the first, second, third, fourth, and fifth lens elements 110, 120, 130, 140, 150 and the filtering unit 160 may comprise an object-side surface 111/121/131/141/151/161 facing toward the object side A1 and an image-side surface 112/122/132/142/152/162 facing toward the image side A2. The example embodiment of the filtering unit 160 illustrated is an IR cut filter (infrared cut filter) positioned between the fifth lens element 150 and an image plane 170. The filtering unit 160 selectively absorbs light passing optical lens assembly 1 that has a specific wavelength. For example, if IR light is absorbed, IR light which is not seen by human eyes is prohibited from producing an image on the image plane 170.

Exemplary embodiments of each lens element of the optical lens assembly 1 will now be described with reference to the drawings. The lens elements of the optical lens assembly 1 are constructed using plastic material, in some embodiments.

An example embodiment of the first lens element 110 may have negative refracting power. The object-side surface 111 may comprise a convex portion 1111 in a vicinity of an optical axis and a convex portion 1112 in a vicinity of a periphery of the first lens element 110. The image-side surface 112 may comprise a concave portion 1121 in a vicinity of the optical axis and a concave portion 1122 in a vicinity of the periphery of the first lens element 110. The object-side surface 111 and the image-side surface 112 may be aspherical surfaces.

An example embodiment of the second lens element 120 may have positive refracting power. The object-side surface 121 may comprise a convex portion 1211 in a vicinity of the optical axis and a convex portion 1212 in a vicinity of a periphery of the second lens element 120. The image-side surface 122 may comprise a concave portion 1221 in a vicinity of the optical axis and a concave portion 1222 in a vicinity of the periphery of the second lens element 120.

An example embodiment of the third lens element 130 may have positive refracting power. The object-side surface 131 may comprise a convex portion 1311 in a vicinity of the optical axis and a convex portion 1312 in a vicinity of a periphery of the third lens element 130. The image-side surface 132 may comprise a convex portion 1321 in a vicinity of the optical axis and a convex portion 1322 in a vicinity of the periphery of the third lens element 130.

An example embodiment of the fourth lens element 140 may have negative refracting power. The object-side surface 141 may comprise a concave portion 1411 in a vicinity of the optical axis and a concave portion 1412 in a vicinity of a periphery of the fourth lens element 140. The image-side surface 142 may comprise a convex portion 1421 in a vicinity of the optical axis and a convex portion 1422 in a vicinity of the periphery of the fourth lens element 140.

An example embodiment of the fifth lens element 150 may have positive refracting power. The object-side surface 151 may comprise a convex portion 1511 in a vicinity of the optical axis and a convex portion 1512 in a vicinity of a periphery of the fifth lens element 150. The image-side surface 152 may comprise a concave portion 1521 in a vicinity of the optical axis and a convex portion 1522 in a vicinity of the periphery of the fifth lens element 150.

The aspherical surfaces including the object-side surface 111 of the first lens element 110, the image-side surface 112 of the first lens element 110, the object-side surface 121 and the image-side surface 122 of the second lens element 120, the object-side surface 131 and the image-side surface 132 of the third lens element 130, the object-side surface 141 and the image-side surface 142 of the fourth lens element 140, the object-side surface 151 and the image-side surface 152 of the fifth lens element 150 are all defined by the following aspherical formula (1):

$$Z(Y) = \frac{Y^2}{R} \Bigg/ \left(1 + \sqrt{1 - (1+K)\frac{Y^2}{R^2}}\right) + \sum_{i=1}^{n} a_i \times Y^i \quad \text{formula (1)}$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

$a_i$ represents an aspherical coefficient of $i^{th}$ level.

The values of each aspherical parameter are shown in FIG. 9.

FIG. 7(a) shows the longitudinal spherical aberration, wherein the horizontal axis of FIG. 7(a) defines the focus, and the vertical axis of FIG. 7(a) defines the field of view. FIG. 7(b) shows the astigmatism aberration in the sagittal direction, wherein the horizontal axis of FIG. 7(b) defines the focus, and the vertical axis of FIG. 7(b) defines the image height. FIG. 7(c) shows the astigmatism aberration in the tangential direction, wherein the horizontal axis of FIG. 7(c) defines the focus, and the vertical axis of FIG. 7(c) defines the image height. FIG. 7(d) shows the variation of the distortion aberration, wherein the horizontal axis of FIG. 7(d) defines the percentage, and the vertical axis of FIG. 7(d) defines the image height. The three curves with different wavelengths (470 nm, 555 nm, 650 nm) represent that off-axis light with respect to these wavelengths may be focused around an image point. From the vertical deviation of each curve shown in FIG. 7(a), the offset of the off-axis light relative to the image point may be within about ±0.06 mm. Therefore, the first embodiment may improve the longitudinal spherical aberration with respect to different wavelengths. Referring to FIG. 7(b), the focus variation with respect to the three different wavelengths (470 nm, 555 nm, 650 nm) in the whole field may fall within about ±0.01 mm. Referring to FIG. 7(c), the focus variation with respect to the three different wavelengths (470 nm, 555 nm, 650 nm) in the whole field may fall within about ±0.035 mm. Referring to FIG. 7(d), the horizontal axis of FIG. 7(d), the variation of the distortion aberration may be within about ±6%.

The values of T1 , G12 , T2 , G23 , T3 , G34 , T4 , G45 , T5 , G5 F, TF, GFP, BFL, ALT, AAG, TTL, TL, AAG/T2, V2, V1 -V2, V1, EFL/T5, (T1+T2 )/T4, (T1+T3 )/T5 , (T1+G23+G45 )/G12, (T1+G34+G45 )/G12, (T1+G12+G23 )/(T4+G45 ),(T1+G12+G34 )/(T4+G45 ), EFL/T4, (T1+G12 )/T2, (T1+G12 )/T4, BFL/T3, BFL/T5, AAG/T1, AAG/T4, TTL/ALT and TTL/(T2+T3+T4+T5 ) of this embodiment may be referred to FIGS. 54A and 54B.

The distance from the object -side surface 111 of the first lens element 110 to the image plane 170 along the optical axis (TTL) may be about 3.946 mm, Fno may be about 2.388(the size of aperture decreases while Fno increases), HFOV may be about 55.813 degrees, and the image height may be about 1.815 mm. In accordance with these values, the present embodiment may provide an optical lens assembly having a shortened length, and may be capable of accommodating a reduced product profile that also renders a bigger field of view and improved optical performances.

Figure 10:
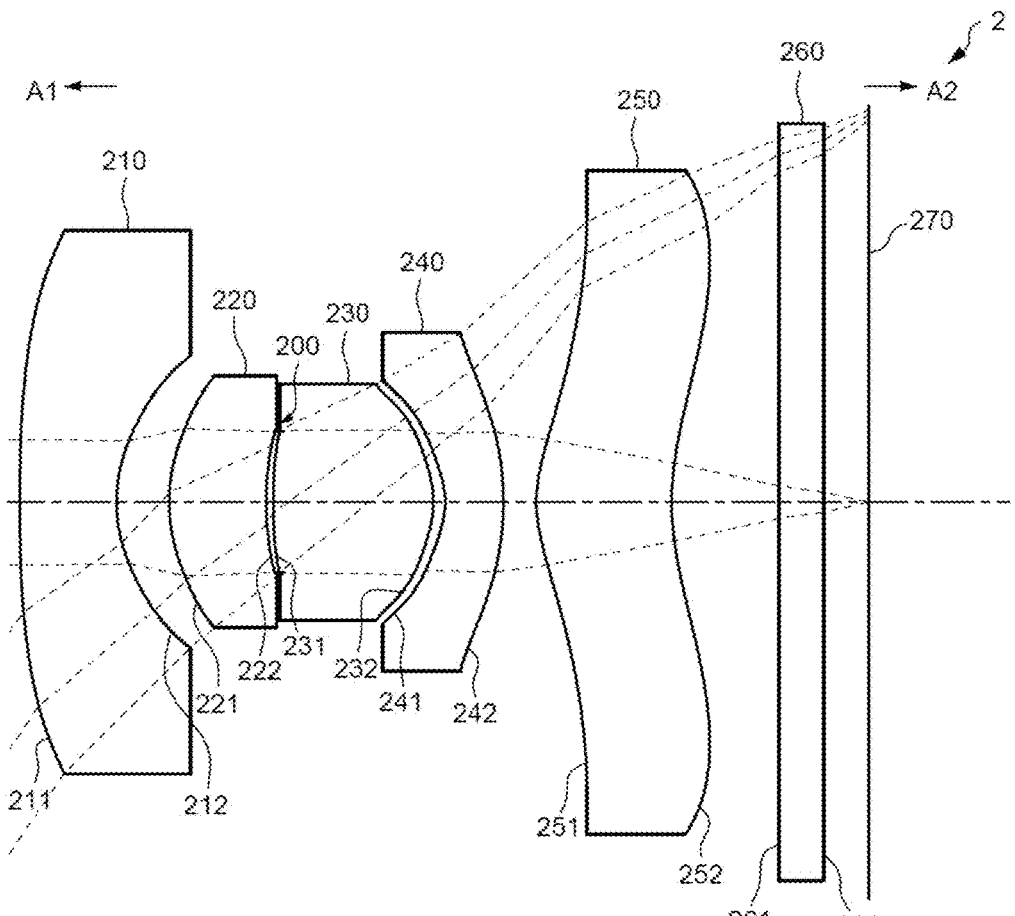
FIG. 10 depicts a cross-sectional view of a second embodiment of an optical lens assembly having seven lens elements according to the present disclosure.
Figure 11:
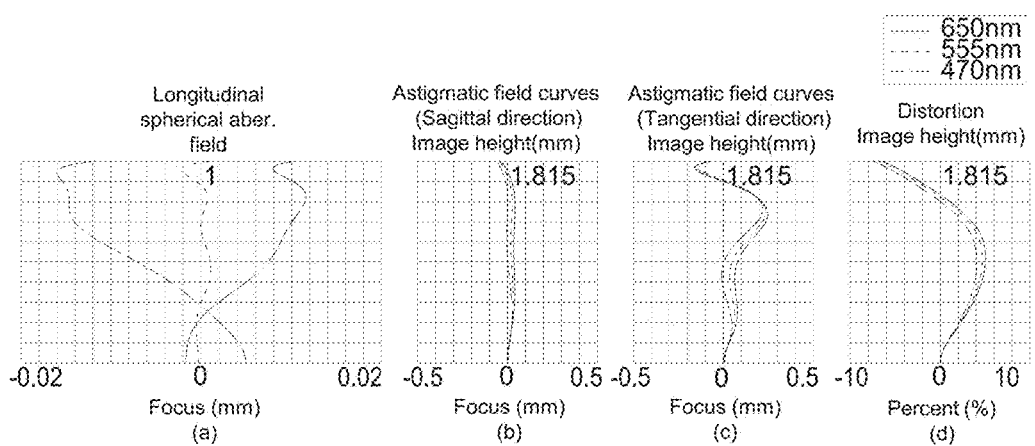
FIG. 11 depicts a chart of longitudinal spherical aberration and other kinds of optical aberrations of a second embodiment of the optical lens assembly according the present disclosure.

Reference is now made to FIGS. 10-13. FIG. 10 illustrates an example cross-sectional view of an optical lens assembly 2 having five lens elements according to a second example embodiment. FIG. 11 shows example charts of longitudinal spherical aberration and other kinds of optical aberrations of the optical lens assembly 2 according to the second example embodiment. FIG. 12 shows an example table of optical data of each lens element of the optical lens assembly 2 according to the second example embodiment. FIG. 13 shows an example table of aspherical data of the optical lens assembly 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 10, the optical lens assembly 2 of the present embodiment, in an order from an object side A1 to an image side A2 along an optical axis, may comprise a first lens element 210, a second lens element 220, an aperture stop 200, a third lens element 230, a fourth lens element 240, and a fifth lens element 250.

The arrangement of the convex or concave surface structures, including the object-side surfaces 211, 221, 231, 241, 251 and the image-side surfaces 212, 222, 232, 242, 252 are generally similar to the optical lens assembly 1. Additional differences may include a radius of curvature, a thickness, an aspherical data, and an effective focal length of each lens element. Here, for clearly showing the drawings of the present embodiment, only the surface shapes which are different from that in the first embodiment are labeled. Please refer to FIG. 12 for the optical characteristics of each lens element in the optical lens assembly 2 of the present embodiment.

From the vertical deviation of each curve shown in FIG. 11(*a*), the offset of the off-axis light relative to the image point may be within about ±0.016 mm. Referring to FIG. 11(*b*), the focus variation with respect to the three different wavelengths (470 nm, 555 nm, 650 nm) in the whole field may fall within about ±0.01 mm. Referring to FIG. 11(*c*), the focus variation with respect to the three different wavelengths (470 nm, 555 nm, 650 nm) in the whole field may fall within about ±0.025 mm. Referring to FIG. 11(*d*), the variation of the distortion aberration of the optical lens assembly 2 may be within about ±8%.

The values of T1, G12, T2, G23, T3, G34, T4, G45, T5, G5F, TF, GFP, BFL, ALT, AAG, TTL, TL, AAG/T2, V2, V1-V2, V1, EFL/T5, (T1+T2)/T4, (T1+T3)/T5, (T1+G23+G45)/G12,(T1+G34+G45)/G12,(T1+G12+G23)/(T4+G45), (T1+G12+G34)/(T4+G45), EFL/T4, (T1+G12)/T2, (T1+G12)/T4, BFL/T3, BFL/T5, AAG/T1, AAG/T4,TTL/ALT and TTL/(T2+T3+T4+T5) of this embodiment may be referred to FIGS. 54A and 54B.

In comparison with the first embodiment, the astigmatism aberration in this embodiment may be smaller. Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 14:
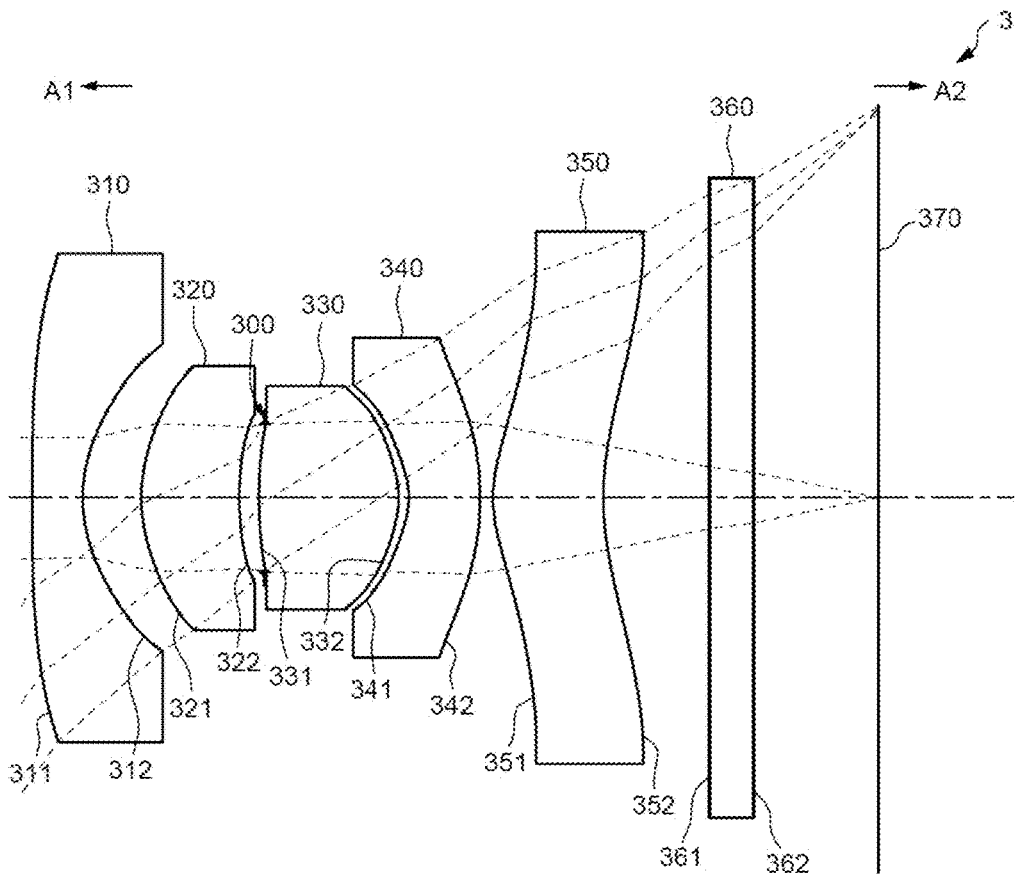
FIG. 14 depicts a cross-sectional view of a third embodiment of an optical lens assembly having seven lens elements according to the present disclosure.
Figure 15:
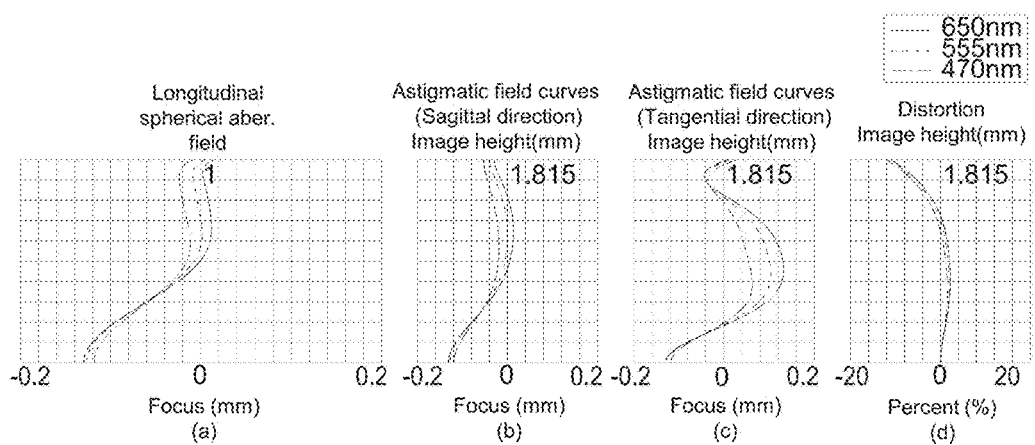
FIG. 15 depicts a chart of longitudinal spherical aberration and other kinds of optical aberrations of a third embodiment of the optical lens assembly according the present disclosure.

Reference is now made to FIGS. 14-17. FIG. 14 illustrates an example cross-sectional view of an optical lens assembly 3 having five lens elements according to a third example embodiment. FIG. 15 shows example charts of longitudinal spherical aberration and other kinds of optical aberrations of the optical lens assembly 3 according to the third example embodiment. FIG. 16 shows an example table of optical data of each lens element of the optical lens assembly 3 according to the third example embodiment. FIG. 17 shows an example table of aspherical data of the optical lens assembly 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 14, the optical lens assembly 3 of the present embodiment, in an order from an object side A1 to an image side A2 along an optical axis, may comprise a first lens element 310, a second lens element 320, an aperture stop 300, a third lens element 330, a fourth lens element 340, and a fifth lens element 350.

The arrangement of the convex or concave surface structures, including the object-side surfaces 311, 321, 331, 341, 35 1 and the image-side surfaces 312, 322, 332, 342, 352 are generally similar to the optical lens assembly 1. Additional differences may include a radius of curvature, a thickness, aspherical data, and an effective focal length of each lens element. More specifically, the image-side surface 332 of the third lens element 330 may comprise a concave portion 3322 in a vicinity of a periphery of the third lens element 330.

Here, for clearly showing the drawings of the present embodiment, only the surface shapes which are different from that in the first embodiment are labeled. Please refer to FIG. 16 for the optical characteristics of each lens element in the optical lens assembly 3 of the present embodiment.

From the vertical deviation of each curve shown in FIG. 15(*a*), the offset of the off-axis light relative to the image point may be within about ±0.14 mm. Referring to FIG. 15(*b*), the focus variation with respect to the three different wavelengths (470 nm, 555 nm, 650 nm) in the whole field may fall within about ±0.14 mm. Referring to FIG. 15(*c*), the focus variation with respect to the three different wavelengths (470 nm, 555 nm, 650 nm) in the whole field may fall within about ±0.14 mm. Referring to FIG. 15(*d*), the variation of the distortion aberration of the optical lens assembly 3 may be within about ±16%.

The values of T1, G12, T2, G23, T3, G34, T4, G45, T5, G5F, TF, GFP, BFL, ALT, AAG, TTL, TL, AAG/T2, V2, V1-V2, V1, EFL/T5, (T1+T2)/T4, (T1+T3)/T5, (T1+G23+G45)/G12,(T1+G34+G45)/G12,(T1+G12+G23)/(T4+G45), (T1+G12+G34)/(T4+G45), EFL/T4, (T1+G12)/T2, (T1+G12)/T4, BFL/T3, BFL/T5, AAG/T1, AAG/T4, TTL/ALT and TTL/(T2+T3+T4+T5) of this embodiment may be referred to FIGS. 54A and 54B.

In comparison with the first embodiment, the size of the aperture stop in this embodiment may be smaller. Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 18:
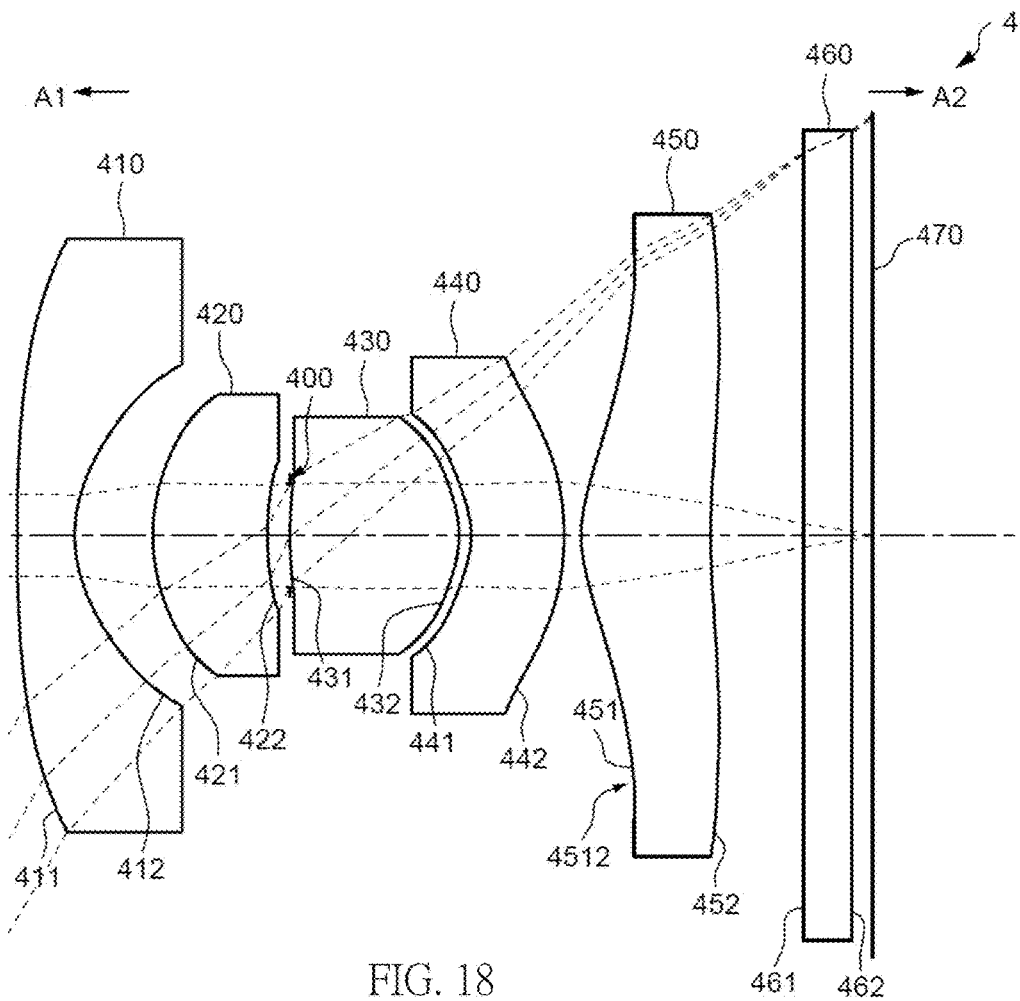
FIG. 18 depicts a cross-sectional view of a fourth embodiment of an optical lens assembly having seven lens elements according to the present disclosure.
Figure 19:
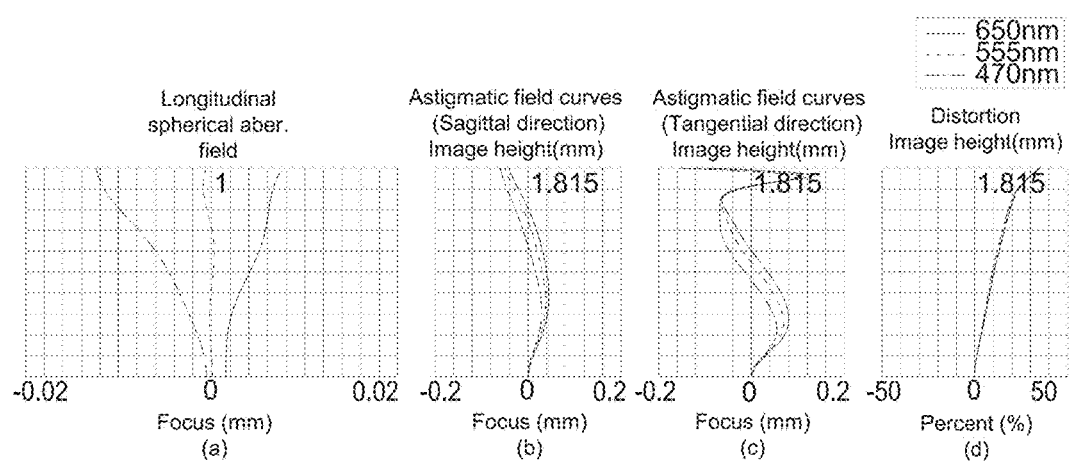
FIG. 19 depicts a chart of longitudinal spherical aberration and other kinds of optical aberrations of a fourth embodiment of the optical lens assembly according the present disclosure.

Reference is now made to FIGS. 18-21. FIG. 18 illustrates an example cross-sectional view of an optical lens assembly 4 having five lens elements according to a fourth example embodiment. FIG. 19 shows example charts of longitudinal spherical aberration and other kinds of optical aberrations of the optical lens assembly 4 according to the fourth embodiment. FIG. 20 shows an example table of optical data of each lens element of the optical lens assembly 4 according to the fourth example embodiment. FIG. 21 shows an example table of aspherical data of the optical lens assembly 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 18, the optical lens assembly 4 of the present embodiment, in an order from an object side A1 to an image side A2 along an optical axis, may comprise a first lens element 410, a second lens element 420, an aperture stop 400, a third lens element 430, a fourth lens element 440, and a fifth lens element 450.

The arrangement of the convex or concave surface structures, including the object-side surfaces 411, 421, 431, 441 and the image-side surfaces 412, 422, 432, 442, 452 are generally similar to the optical lens assembly 1, but the differences between the optical lens assembly 1 and the optical lens assembly 4 may include the convex or concave surface structure of the object-side surface 451. Additional differences may include a radius of curvature, a thickness, aspherical data, and an effective focal length of each lens element. More specifically, the object-side surface 451 of the fifth lens element 450 may comprise a concave portion 4512 in a vicinity of a periphery of the fifth lens element 450.

Here, for clearly showing the drawings of the present embodiment, only the surface shapes which are different from that in the first embodiment are labeled. Please refer to FIG. 20 for the optical characteristics of each lens elements in the optical lens assembly 4 of the present embodiment.

From the vertical deviation of each curve shown in FIG. 19(a), the offset of the off-axis light relative to the image point may be within about ±0.014 mm. Referring to FIG. 19(b), the focus variation with respect to the three different wavelengths (470 nm, 555 nm, 650 nm) in the whole field may fall within about ±0.06 mm. Referring to FIG. 19(c), the focus variation with respect to the three different wavelengths (470 nm, 555 nm, 650 nm) in the whole field may fall within about ±0.16 mm. Referring to FIG. 19(d), the variation of the distortion aberration of the optical lens assembly 4 may be within about ±35%.

The values of T1, G12, T2, G23, T3, G34, T4, G45, T5, G5F, TF, GFP, BFL, ALT, AAG, TTL, TL, AAG/T2, V2, V1-V2, V1, EFL/T5, (T1+T2)/T4, (T1+T3)/T5, (T1+G23+G45)/G12,(T1+G34+G45)/G12,(T1+G12+G23)/(T4+G45), (T1+G12+G34)/(T4+G45), EFL/T4, (T1+G12)/T2, (T1+G12)/T4, BFL/T3, BFL/T5, AAG/T1, AAG/T4, TTL/ALT and TTL/(T2+T3+T4+T5) of this embodiment may be referred to FIGS. 54A and 54B.

In comparison with the first embodiment, TTL in this embodiment may be smaller, HFOV in this embodiment may be larger, the longitudinal spherical aberration in this embodiment may be smaller. Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 22:
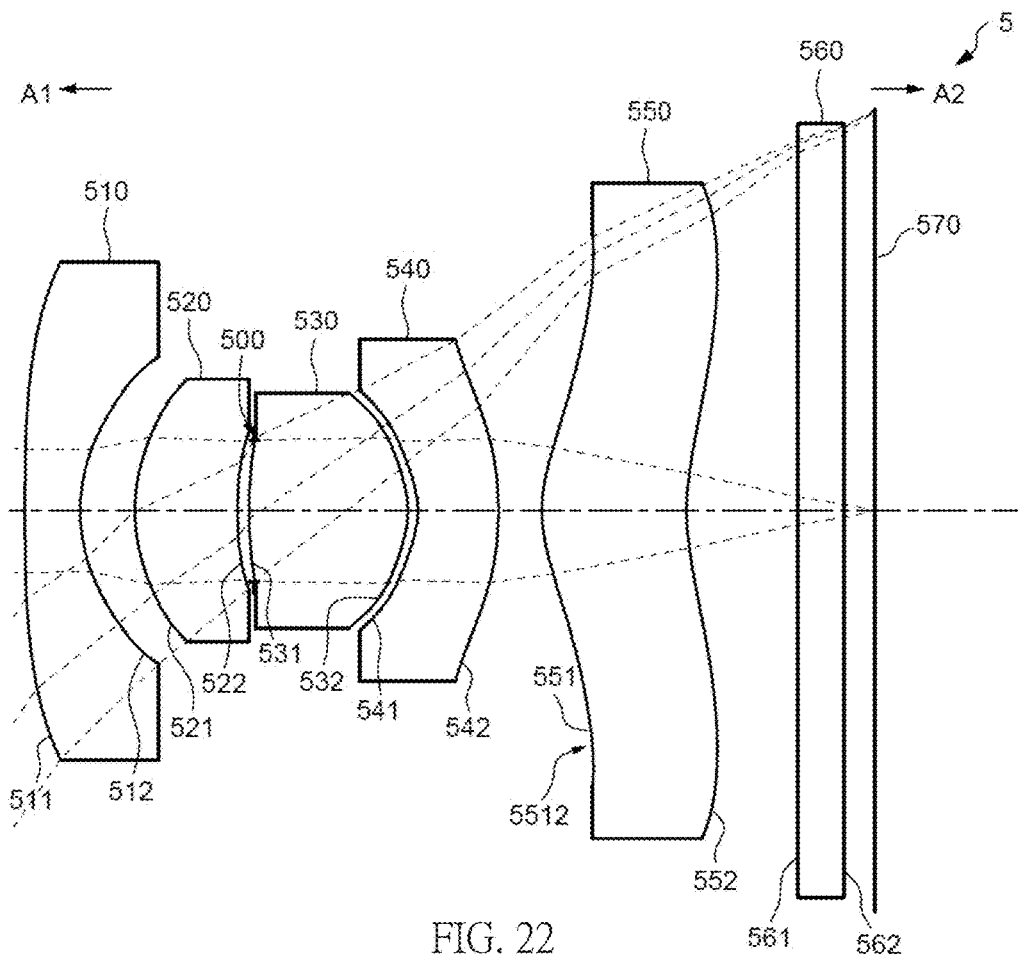
FIG. 22 depicts a cross-sectional view of a fifth embodiment of an optical lens assembly having seven lens elements according to the present disclosure.
Figure 23:
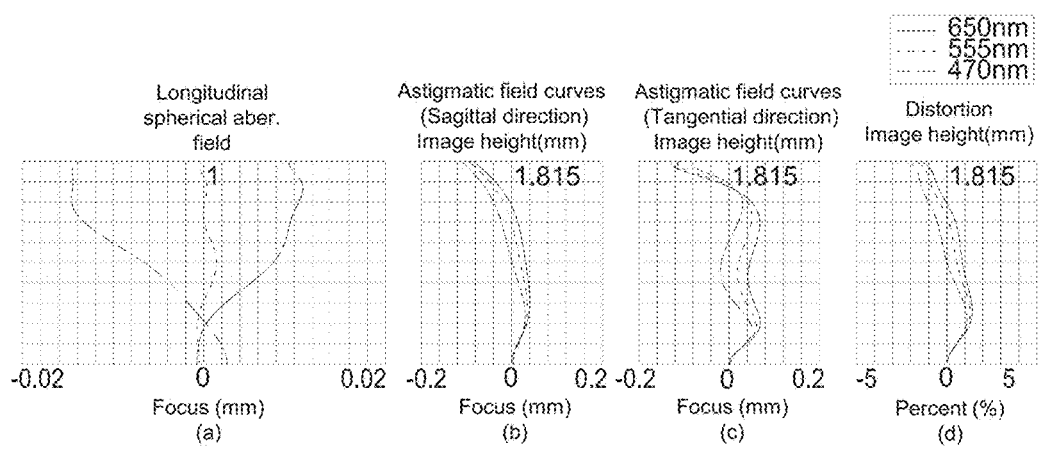
FIG. 23 depicts a chart of longitudinal spherical aberration and other kinds of optical aberrations of a fifth embodiment of the optical lens assembly according the present disclosure.

Reference is now made to FIGS. 22-25. FIG. 22 illustrates an example cross-sectional view of an optical lens assembly 5 having five lens elements according to a fifth example embodiment. FIG. 23 shows example charts of longitudinal spherical aberration and other kinds of optical aberrations of the optical lens assembly 5 according to the fifth embodiment. FIG. 24 shows an example table of optical data of each lens element of the optical lens assembly 5 according to the fifth example embodiment. FIG. 25 shows an example table of aspherical data of the optical lens assembly 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 22, the optical lens assembly 5 of the present embodiment, in an order from an object side A1 to an image side A2 along an optical axis, may comprise a first lens element 510, a second lens element 520, an aperture stop 500, a third lens element 530, a fourth lens element 540, and a fifth lens element 550.

The arrangement of the convex or concave surface structures, including the object-side surfaces 511, 521, 531, 541 and the image-side surfaces 512, 522, 532, 542, 552 are generally similar to the optical lens assembly 1, but the differences between the optical lens assembly 1 and the optical lens assembly 5 may include the convex or concave surface structure of the object-side surface 551. Additional differences may include a radius of curvature, a thickness, aspherical data, and an effective focal length of each lens element. More specifically, the object-side surface 551 may include a concave portion 5512 in a vicinity of a periphery of the fifth lens element 550.

Here, for clearly showing the drawings of the present embodiment, only the surface shapes which are different from that in the first embodiment are labeled. FIG. 24 depicts the optical characteristics of each lens elements in the optical lens assembly 5 of the present embodiment.

From the vertical deviation of each curve shown in FIG. 23(a), the offset of the off-axis light relative to the image point may be within about ±0.016 mm. Referring to FIG. 23(b), the focus variation with respect to the three different wavelengths (470 nm, 555 nm, 650 nm) in the whole field may fall within about ±0.12 mm. Referring to FIG. 23(c), the focus variation with respect to the three different wavelengths (470 nm, 555 nm, 650 nm) in the whole field may fall within about ±0.14 mm. Referring to FIG. 23(d), the variation of the distortion aberration of the optical lens assembly 5 may be within about ±2.5%.

The values of T1, G12, T2, G23, T3, G34, T4, G45, T5, G5F, TF, GFP, BFL, ALT, AAG, TTL, TL, AAG/T2, V2, V1-V2, V1, EFL/T5, (T1+T2)/T4, (T1+T3)/T5, (T1+G23+G45)/G12,(T1+G34+G45)/G12,(T1+G12+G23)/(T4+G45), (T1+G12+G34)/(T4+G45), EFL/T4, (T1+G12)/T2, (T1+G12)/T4, BFL/T3, BFL/T5, AAG/T1, AAG/T4, TTL/ALT and TTL/(T2+T3+T4+T5) of this embodiment may be referred to FIGS. 54A and 54B.

In comparison with the first embodiment, TTL in this embodiment may be smaller, the longitudinal spherical aberration in this embodiment may be smaller, the distortion aberration in this embodiment may be smaller. Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 26:
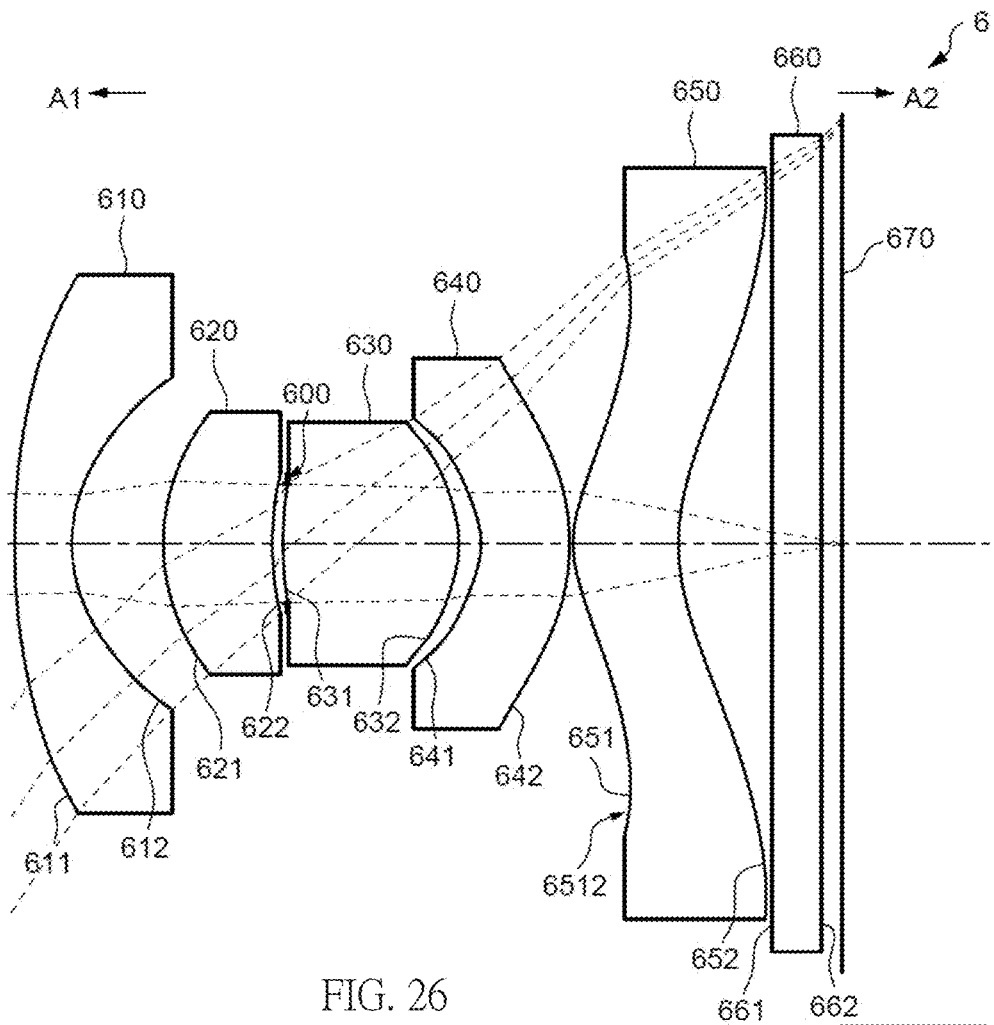
FIG. 26 depicts a cross-sectional view of a sixth embodiment of an optical lens assembly having seven lens elements according to the present disclosure.
Figure 27:
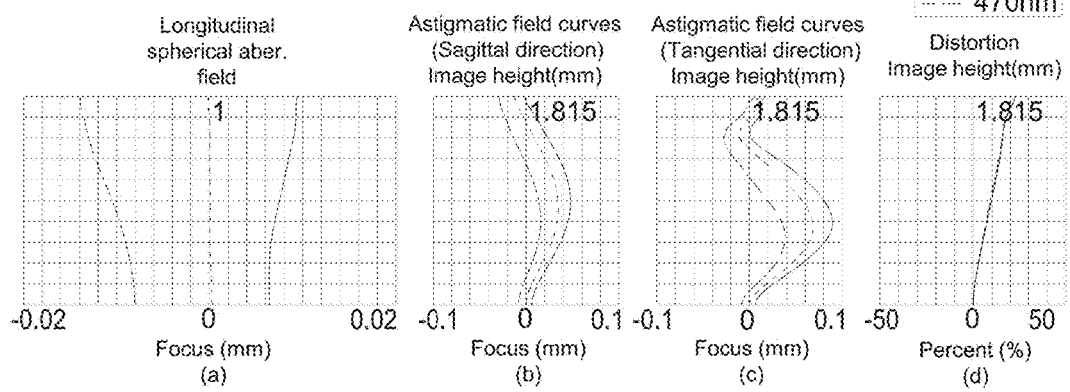
FIG. 27 depicts a chart of longitudinal spherical aberration and other kinds of optical aberrations of a sixth embodiment of the optical lens assembly according to the present disclosure.

Reference is now made to FIGS. 26-29. FIG. 26 illustrates an example cross-sectional view of an optical lens assembly 6 having five lens elements according to a sixth example embodiment. FIG. 27 shows example charts of longitudinal spherical aberration and other kinds of optical aberrations of the optical lens assembly 6 according to the sixth embodiment. FIG. 28 shows an example table of optical data of each lens element of the optical lens assembly 6 according to the sixth example embodiment. FIG. 29 shows an example table of aspherical data of the optical lens assembly 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 26, the optical lens assembly 6 of the present embodiment, in an order from an object side A1 to an image side A2 along an optical axis, may comprise a first lens element 610, a second lens element 620, an aperture stop 600, a third lens element 630, a fourth lens element 640, and a fifth lens element 650.

The arrangement of the convex or concave surface structures, including the object-side surfaces 611, 621, 631, 641 and the image-side surfaces 612, 622, 632 642, 652 are generally similar to the optical lens assembly 1, but the differences between the optical lens assembly 1 and the optical lens assembly 6 may include the convex or concave surface structures of the object-side surface 651. Additional differences may include a radius of curvature, a thickness, aspherical data, and an effective focal length of each lens element. More specifically, the object-side surface 651 of the fifth lens element 650 may comprise a concave portion 6512 in a vicinity of a periphery of the fifth lens element 650.

Here, for clearly showing the drawings of the present embodiment, only the surface shapes which are different from that in the first embodiment are labeled. Please refer to FIG. 28 for the optical characteristics of each lens elements in the optical lens assembly 6 of the present embodiment.

From the vertical deviation of each curve shown in FIG. 27($a$), the offset of the off-axis light relative to the image point may be within about ±0.014 mm. Referring to FIG. 27($b$), the focus variation with respect to the three different wavelengths (470 nm, 555 nm, 650 nm) in the whole field may fall within about ±0.05 mm. Referring to FIG. 23($c$), the focus variation with respect to the three different wavelengths (470 nm, 555 nm, 650 nm) in the whole field may fall within about ±0.08 mm. Referring to FIG. 27($d$), the variation of the distortion aberration of the optical lens assembly 6 may be within about ±25%.

The values of T1, G12, T2, G23, T3, G34, T4, G45, T5, G5F, TF, GFP, BFL, ALT, AAG, TTL, TL, AAG/T2, V2, V1-V2, V1, EFL/T5, (T1+T2)/T4, (T1+T3)/T5, (T1+G23+G45)/G12,(T1+G34+G45)/G12,(T1+G12+G23)/(T4+G45), (T1+G12+G34)/(T4+G45), EFL/T4, (T1+G12)/T2, (T1+G12)/T4, BFL/T3, BFL/T5, AAG/T1, AAG/T4, TTL/ALT and TTL/(T2+T3+T4+T5) of this embodiment may be referred to FIGS. 54A and 54B.

In comparison with the first embodiment, TTL in this embodiment may be smaller, HFOV may be larger. Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 30:
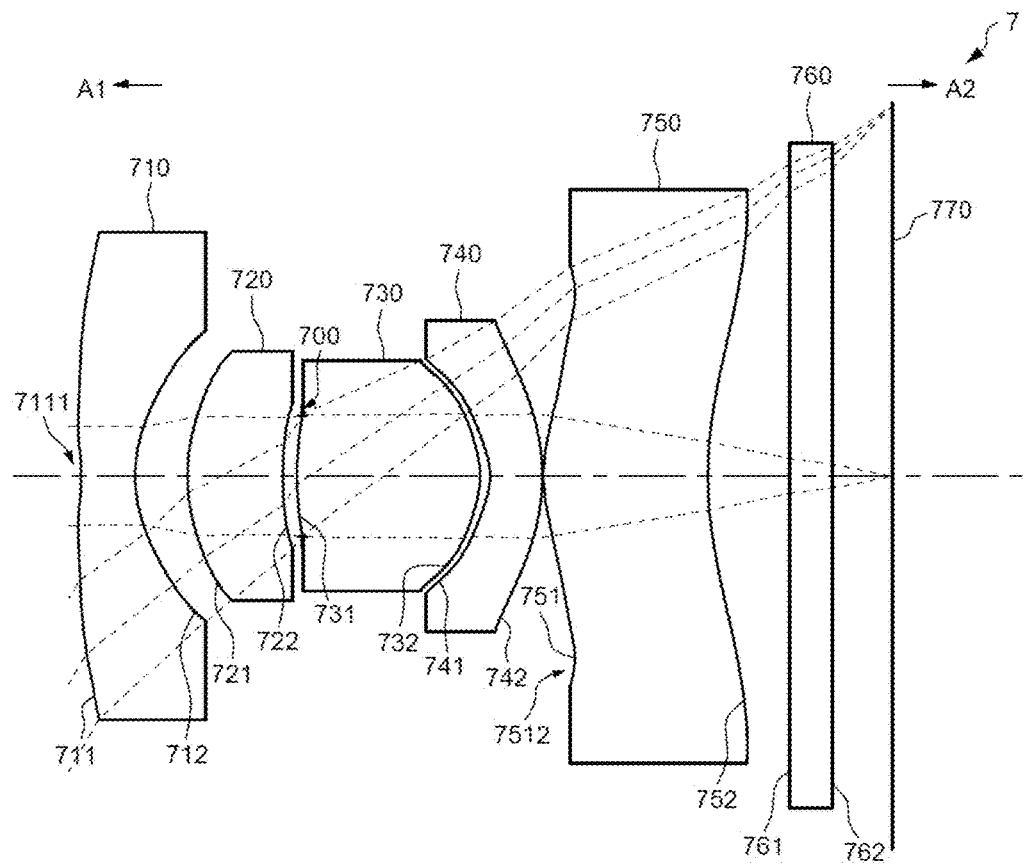
FIG. 30 depicts a cross-sectional view of a seventh embodiment of an optical lens assembly having seven lens elements according to the present disclosure.
Figure 31:
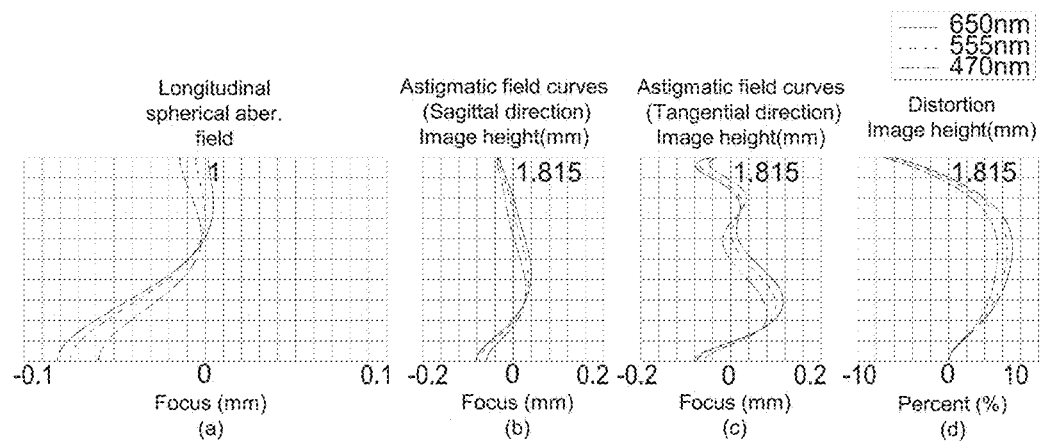
FIG. 31 depicts a chart of longitudinal spherical aberration and other kinds of optical aberrations of a seventh embodiment of the optical lens assembly according to the present disclosure.

Reference is now made to FIGS. 30-33. FIG. 30 illustrates an example cross-sectional view of an optical lens assembly 7 having five lens elements according to a seventh example embodiment. FIG. 31 shows example charts of longitudinal spherical aberration and other kinds of optical aberrations of the optical lens assembly 7 according to the seventh embodiment. FIG. 32 shows an example table of optical data of each lens element of the optical lens assembly 7 according to the seventh example embodiment. FIG. 33 shows an example table of aspherical data of the optical lens assembly 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 30, the optical lens assembly 7 of the present embodiment, in an order from an object side A1 to an image side A2 along an optical axis, may comprise a first lens element 710, a second lens element 720, an aperture stop 700, a third lens element 730, fourth lens element 740, and a fifth lens element 750.

The arrangement of the convex or concave surface structures, including the object-side surfaces 721, 731, 741 and the image-side surfaces 712, 722, 732, 742, 752 are generally similar to the optical lens assembly 1, but the differences between the optical lens assembly 1 and the optical lens assembly 7 may include the convex or concave surface structures of the object-side surfaces 711 and 751. Additional differences may include a radius of curvature, a thickness, aspherical data, and an effective focal length of each lens element. More specifically, the object-side surface 711 of the first lens element 710 may comprise a concave portion 7111 in a vicinity of the optical axis, the object-side surface 751 of the fifth lens element 750 may comprise a concave portion 7512 in a vicinity of a periphery of the fifth lens element 750.

Here, for clearly showing the drawings of the present embodiment, only the surface shapes which are different from that in the first embodiment are labeled. Please refer to FIG. 32 for the optical characteristics of each lens elements in the optical lens assembly 7 of the present embodiment.

From the vertical deviation of each curve shown in FIG. 31($a$), the offset of the off-axis light relative to the image point may be within about ±0.09 mm. Referring to FIG. 31($b$), the focus variation with respect to the three different wavelengths (470 nm, 555 nm, 650 nm) in the whole field may fall within about ±0.08 mm. Referring to FIG. 31($c$), the focus variation with respect to the three different wavelengths (470 nm, 555 nm, 650 nm) in the whole field may fall within about ±0.12 mm. Referring to FIG. 31($d$), the variation of the distortion aberration of the optical lens assembly 7 may be within about ±8%.

The values of T1, G12, T2, G23, T3, G34, T4, G45, T5, G5F, TF, GFP, BFL, ALT, AAG, TTL, TL, AAG/T2, V2, V1-V2, V1, EFL/T5, (T1+T2)/T4, (T1+T3)/T5, (T1+G23+G45)/G12,(T1+G34+G45)/G12,(T1+G12+G23)/(T4+G45), (T1+G12+G34)/(T4+G45), EFL/T4, (T1+G12)/T2, (T1+G12)/T4, BFL/T3, BFL/T5, AAG/T1, AAG/T4, TTL/ALT and TTL/(T2+T3+T4+T5) of this embodiment may be referred to FIGS. 54A and 54B.

In comparison with the first embodiment, Fno may be smaller, HFOV may be larger. Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 34:
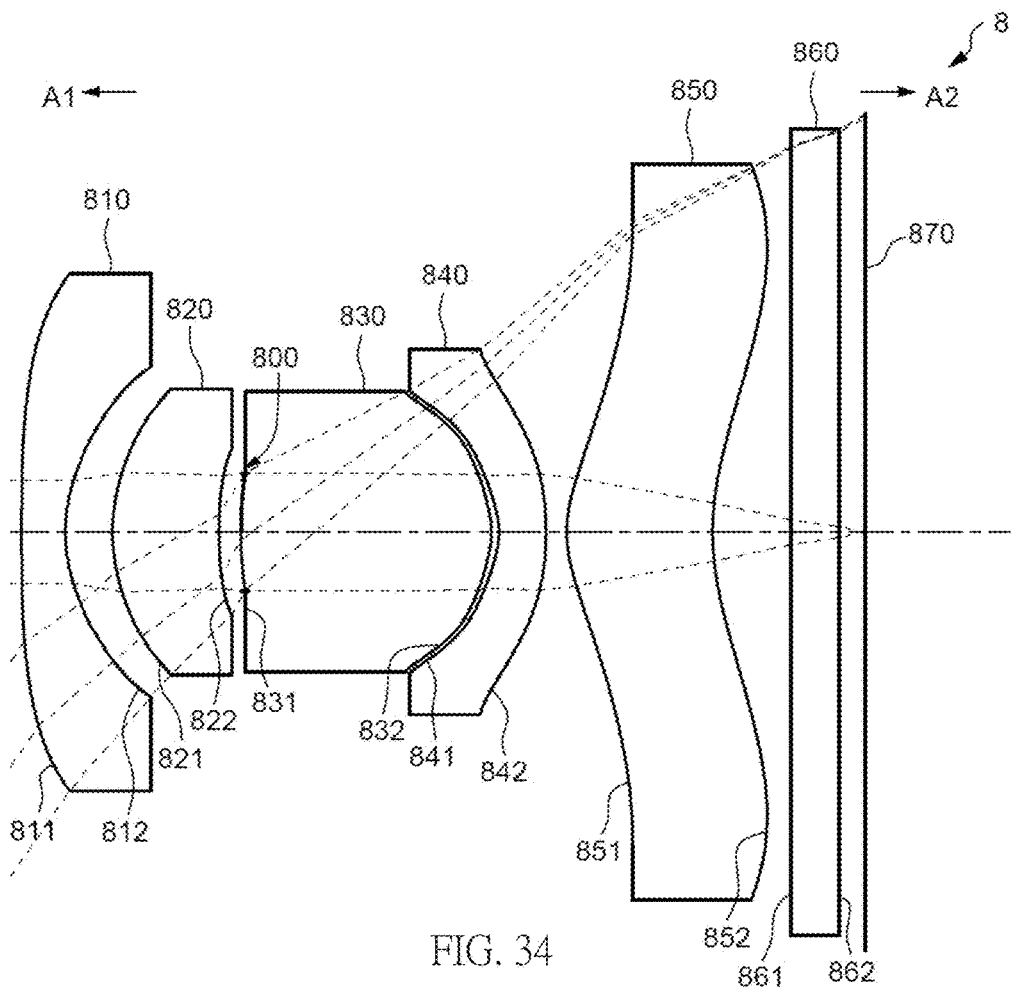
FIG. 34 depicts a cross-sectional view of an eighth embodiment of an optical lens assembly having seven lens elements according to the present disclosure.
Figure 35:
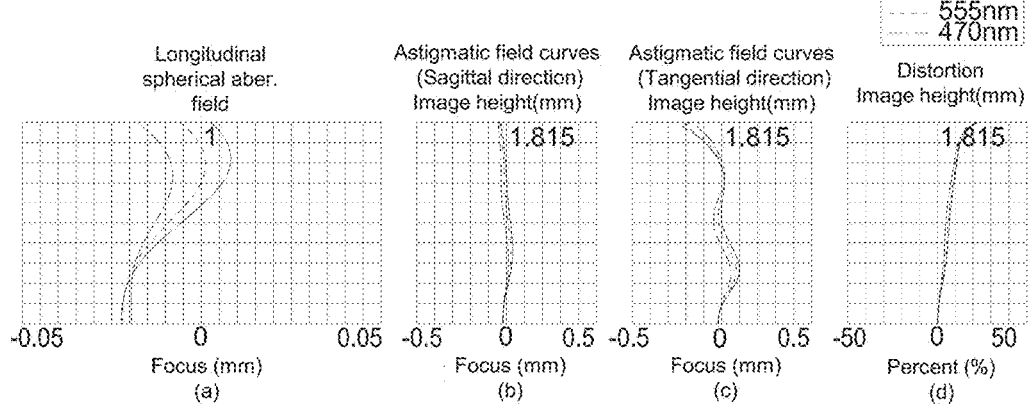
FIG. 35 depicts a chart of longitudinal spherical aberration and other kinds of optical aberrations of an eighth embodiment of the optical lens assembly according to the present disclosure.

Reference is now made to FIGS. 34-37. FIG. 34 illustrates an example cross-sectional view of an optical lens assembly 8 having five lens elements according to an eighth example embodiment. FIG. 35 shows example charts of longitudinal spherical aberration and other kinds of optical aberrations of the optical lens assembly 8 according to the eighth embodiment. FIG. 36 shows an example table of optical data of each lens element of the optical lens assembly 8 according to the eighth example embodiment. FIG. 37 shows an example table of aspherical data of the optical lens assembly 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 34, the optical lens assembly 8 of the present embodiment, in an order from an object side A1 to an image side A2 along an optical axis, may comprise a first lens element 810, a second lens element 820, an aperture stop 800, a third lens element 830, a fourth lens element 840, and a fifth lens element 850.

The arrangement of the convex or concave surface structures, including the object-side surfaces 811, 821, 831, 841, 851 and the image-side surfaces 812, 822, 832, 842 and 852 are generally similar to the optical lens assembly 1. Additional differences may include a radius of curvature, a thickness, aspherical data, and an effective focal length of each lens element.

Here, for clearly showing the drawings of the present embodiment, only the surface shapes which are different from that in the first embodiment are labeled. Please refer to FIG. 36 for the optical characteristics of each lens elements in the optical lens assembly 8 of the present embodiment.

From the vertical deviation of each curve shown in FIG. 35(a), the offset of the off-axis light relative to the image point may be within about ±0.025 mm. Referring to FIG. 35(b), the focus variation with respect to the three different wavelengths (470 nm, 555 nm, 650 nm) in the whole field may fall within about ±0.05 mm. Referring to FIG. 35(c), the focus variation with respect to the three different wavelengths (470 nm, 555 nm, 650 nm) in the whole field may fall within about ±0.25 mm. Referring to FIG. 35(d), the variation of the distortion aberration of the optical lens assembly 8 may be within about ±25%.

The values of T1, G12, T2, G23, T3, G34, T4, G45, T5, G5F, TF, GFP, BFL, ALT, AAG, TTL, TL, AAG/T2, V2, V1-V2, V1, EFL/T5, (T1+T2)/T4, (T1+T3)/T5, (T1+G23+G45)/G12,(T1+G34+G45)/G12,(T1+G12+G23)/(T4+G45), (T1+G12+G34)/(T4+G45), EFL/T4, (T1+G12)/T2, (T1+G12)/T4, BFL/T3, BFL/T5, AAG/T1, AAG/T4, TTL/ALT and TTL/(T2+T3+T4+T5) of this embodiment may be referred to FIGS. 54A and 54B.

In comparison with the first embodiment, TTL in this embodiment may be smaller, the longitudinal spherical aberration in this embodiment may be smaller. Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 38:
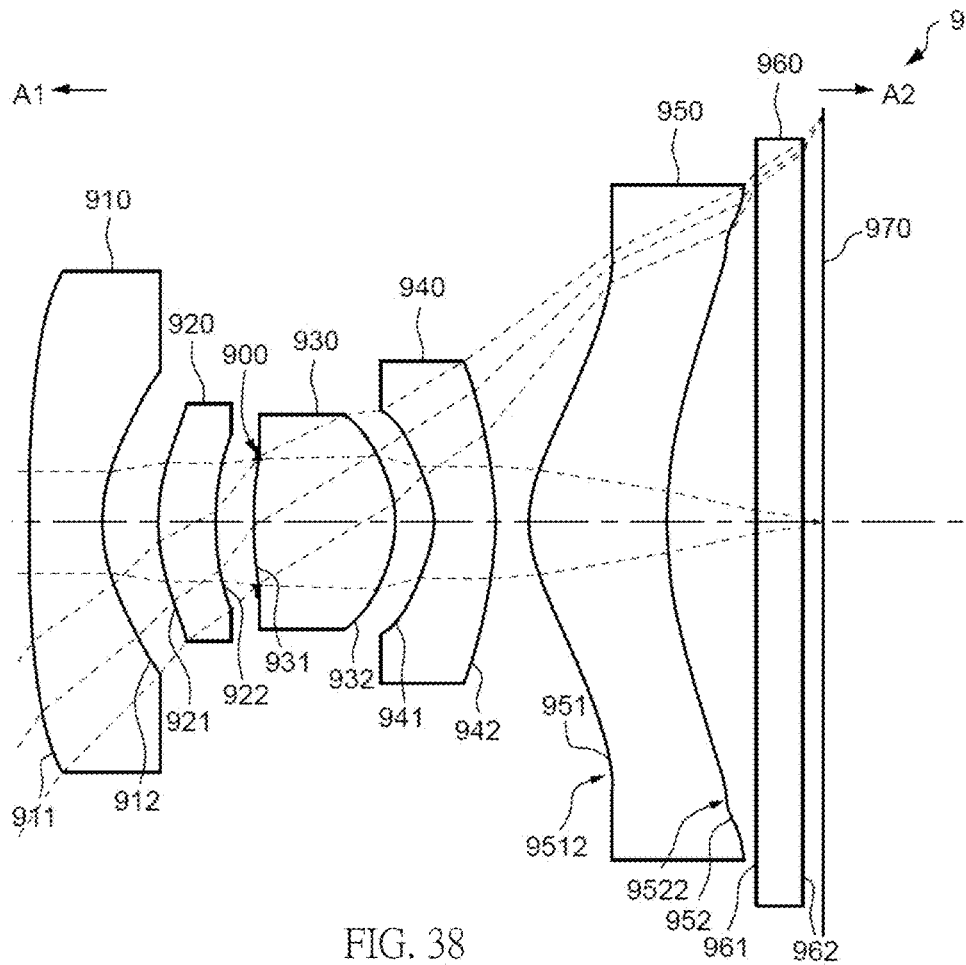
FIG. 38 depicts a cross-sectional view of a ninth embodiment of an optical lens assembly having seven lens elements according to the present disclosure.
Figure 39:
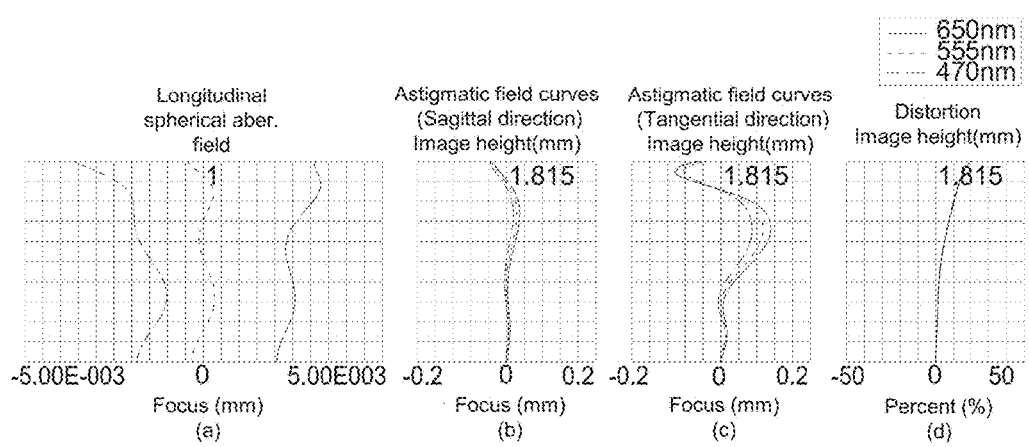
FIG. 39 depicts a chart of longitudinal spherical aberration and other kinds of optical aberrations of a ninth embodiment of the optical lens assembly according to the present disclosure.

Reference is now made to FIGS. 38-41. FIG. 38 illustrates an example cross-sectional view of an optical lens assembly 9 having five lens elements according to a ninth example embodiment. FIG. 39 shows example charts of longitudinal spherical aberration and other kinds of optical aberrations of the optical lens assembly 9 according to the ninth embodiment. FIG. 40 shows an example table of optical data of each lens element of the optical lens assembly 9 according to the ninth example embodiment. FIG. 41 shows an example table of aspherical data of the optical lens assembly 9 according to the ninth example embodiment. The reference numbers labeled in the present embodiment are similar to those in the first embodiment for the similar elements, but here the reference numbers are initialed with 9, for example, reference number 931 for labeling the object-side surface of the third lens element 930, reference number 932 for labeling the image-side surface of the third lens element 930, etc.

As shown in FIG. 38, the optical lens assembly 9 of the present embodiment, in an order from an object side A1 to an image side A2 along an optical axis, may comprise a first lens element 910, a second lens element 920, an aperture stop 900, a third lens element 930, a fourth lens element 940, and a fifth lens element 950.

The arrangement of the convex or concave surface structures, including the object-side surfaces 911, 921, 931, 941 and the image-side surfaces 912, 922, 932, 942 are generally similar to the optical lens assembly 1, but the differences between the optical lens assembly 1 and the optical lens assembly 9 may include the convex or concave surface structures of the object-side surface 951 and the image-side surface 952. Additional differences may include a radius of curvature, a thickness, aspherical data, and an effective focal length of each lens element. More specifically, the object-side surface 951 of the fifth lens element 950 may comprise a concave portion 9512 in a vicinity of a periphery of the fifth lens element 950, the image-side surface 952 of the fifth lens element 950 may comprise a concave portion 9522 in a vicinity of a periphery of the fifth lens element 950.

Here, for clearly showing the drawings of the present embodiment, only the surface shapes which are different from that in the first embodiment are labeled. Please refer to FIG. 40 for the optical characteristics of each lens elements in the optical lens assembly 9 of the present embodiment.

From the vertical deviation of each curve shown in FIG. 39(a), the offset of the off-axis light relative to the image point may be within about ±0.004 mm. Referring to FIG. 39(b), the focus variation with respect to the three different wavelengths (470 nm, 555 nm, 650 nm) in the whole field may fall within about ±0.04 mm. Referring to FIG. 39(c), the focus variation with respect to the three different wavelengths (470 nm, 555 nm, 650 nm) in the whole field may fall within about ±0.12 mm. Referring to FIG. 39(d), the variation of the distortion aberration of the optical lens assembly 9 may be within about ±20%.

The values of T1, G12, T2, G23, T3, G34, T4, G45, T5, G5F, TF, GFP, BFL, ALT, AAG, TTL, TL, AAG/T2, V2, V1-V2, V1, EFL/T5, (T1+T2)/T4, (T1+T3)/T5, (T1+G23+G45)/G12,(T1+G34+G45)/G12,(T1+G12+G23)/(T4+G45), (T1+G12+G34)/(T4+G45), EFL/T4, (T1+G12)/T2, (T1+G12)/T4, BFL/T3, BFL/T5, AAG/T1, AAG/T4, TTL/ALT and TTL/(T2+T3+T4+T5) of this embodiment may be referred to FIGS. 54A and 54B.

In comparison with the first embodiment, TTL in this embodiment may be smaller, the longitudinal spherical aberration in this embodiment may be smaller. Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 42:
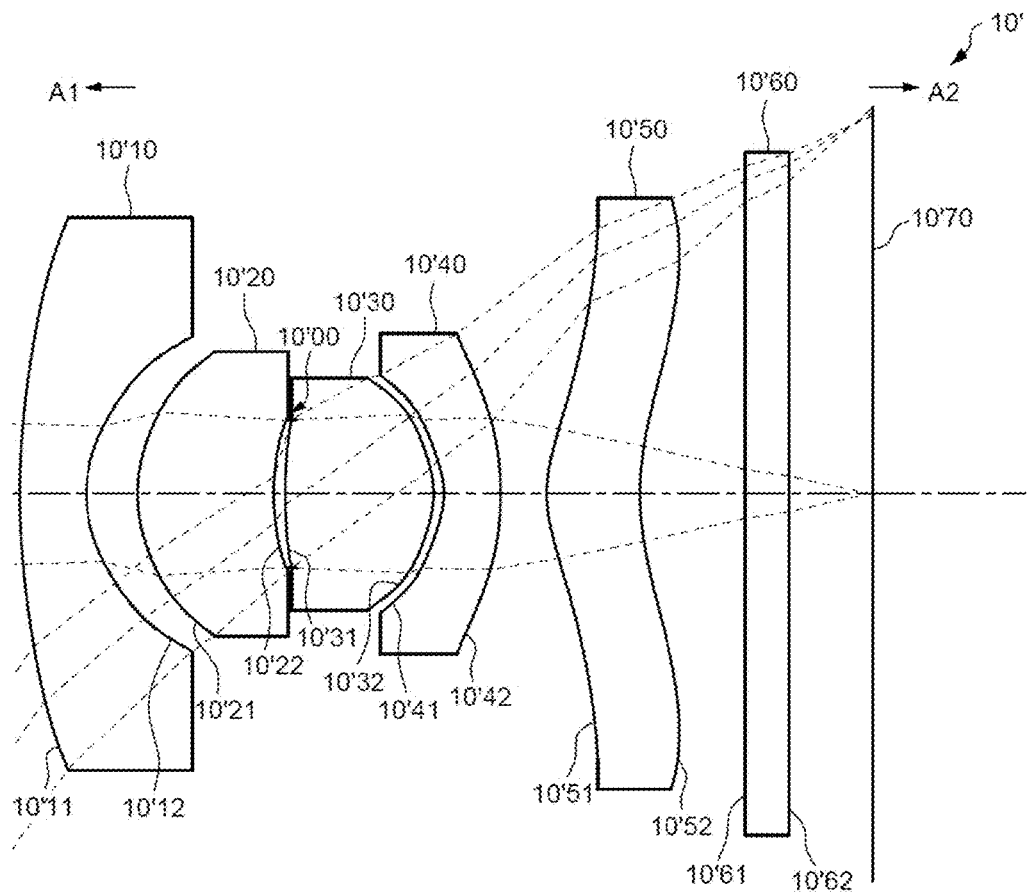
FIG. 42 depicts a cross-sectional view of a tenth embodiment of an optical lens assembly having seven lens elements according to the present disclosure.
Figure 43:
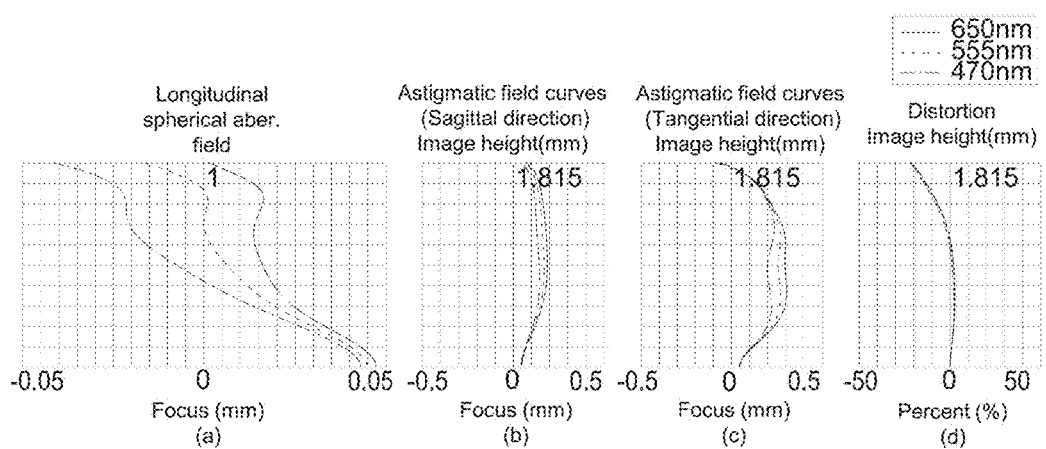
FIG. 43 depicts a chart of longitudinal spherical aberration and other kinds of optical aberrations of a tenth embodiment of the optical lens assembly according to the present disclosure.

Reference is now made to FIGS. 42-45. FIG. 42 illustrates an example cross-sectional view of an optical lens assembly 10'having five lens elements according to a tenth example embodiment. FIG. 43 shows example charts of longitudinal spherical aberration and other kinds of optical aberrations of the optical lens assembly 10' according to the tenth embodiment. FIG. 44 shows an example table of optical data of each lens element of the optical lens assembly 10' according to the tenth example embodiment. FIG. 45 shows an example table of aspherical data of the optical lens assembly 10' according to the tenth example embodiment. The reference numbers labeled in the present embodiment are similar to those in the first embodiment for the similar elements, but here the reference numbers are initialed with 10', for example, reference number 10'31 for labeling the object-side surface of the third lens element 10'30, reference number 10'32 for labeling the image-side surface of the third lens element 10'30, etc.

As shown in FIG. 42, the optical lens assembly 10' of the present embodiment, in an order from an object side A1 to an image side A2 along an optical axis, may comprise a first lens element 10'10, a second lens element 10'20, an aperture stop 10'00, a third lens element 10'30, a fourth lens element 10'40, and a fifth lens element 10'50.

The arrangement of the convex or concave surface structures, including the object-side surfaces 10'11, 10'21, 10'31, 10'41, 10'51 and the image-side surfaces 10'12, 10'22, 10'32, 10'42, 10'52 are generally similar to the optical lens assembly 1. Additional differences may include a radius of curvature, a thickness, aspherical data, and an effective focal length of each lens element. Here, for clearly showing the drawings of the present embodiment, only the surface shapes which are different from that in the first embodiment are labeled. Please refer to FIG. 44 for the optical characteristics of each lens elements in the optical lens assembly 10' of the present embodiment.

From the vertical deviation of each curve shown in FIG. 43(a), the offset of the off-axis light relative to the image point may be within about ±0.05 mm. Referring to FIG. 43(b), the focus variation with respect to the three different wavelengths (470 nm, 555 nm, 650 nm) in the whole field may fall within about ±0.2 mm. Referring to FIG. 43(c), the focus variation with respect to the three different wavelengths (470 nm, 555 nm, 650 nm) in the whole field may fall within about ±0.3 mm. Referring to FIG. 43(d), the variation of the distortion aberration of the optical lens assembly 10' may be within about ±25%.

The values of T1, G12, T2, G23, T3, G34, T4, G45, T5, G5F, TF, GFP, BFL, ALT, AAG, TTL, TL, AAG/T2, V2, V1-V2, V1, EFL/T5, (T1+T2)/T4, (T1+T3)/T5, (T1+G23+G45)/G12,(T1+G34+G45)/G12,(T1+G12+G23)/(T4+G45), (T1+G12+G34)/(T4+G45), EFL/T4, (T1+G12)/T2, (T1+G12)/T4, BFL/T3, BFL/T5, AAG/T1, AAG/T4, TTL/ALT and TTL/(T2+T3+T4+T5) of this embodiment may be referred to FIGS. 54A and 54B.

In comparison with the first embodiment, the longitudinal spherical aberration in this embodiment may be smaller, the astigmatism aberration in this embodiment may be smaller. Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 46:
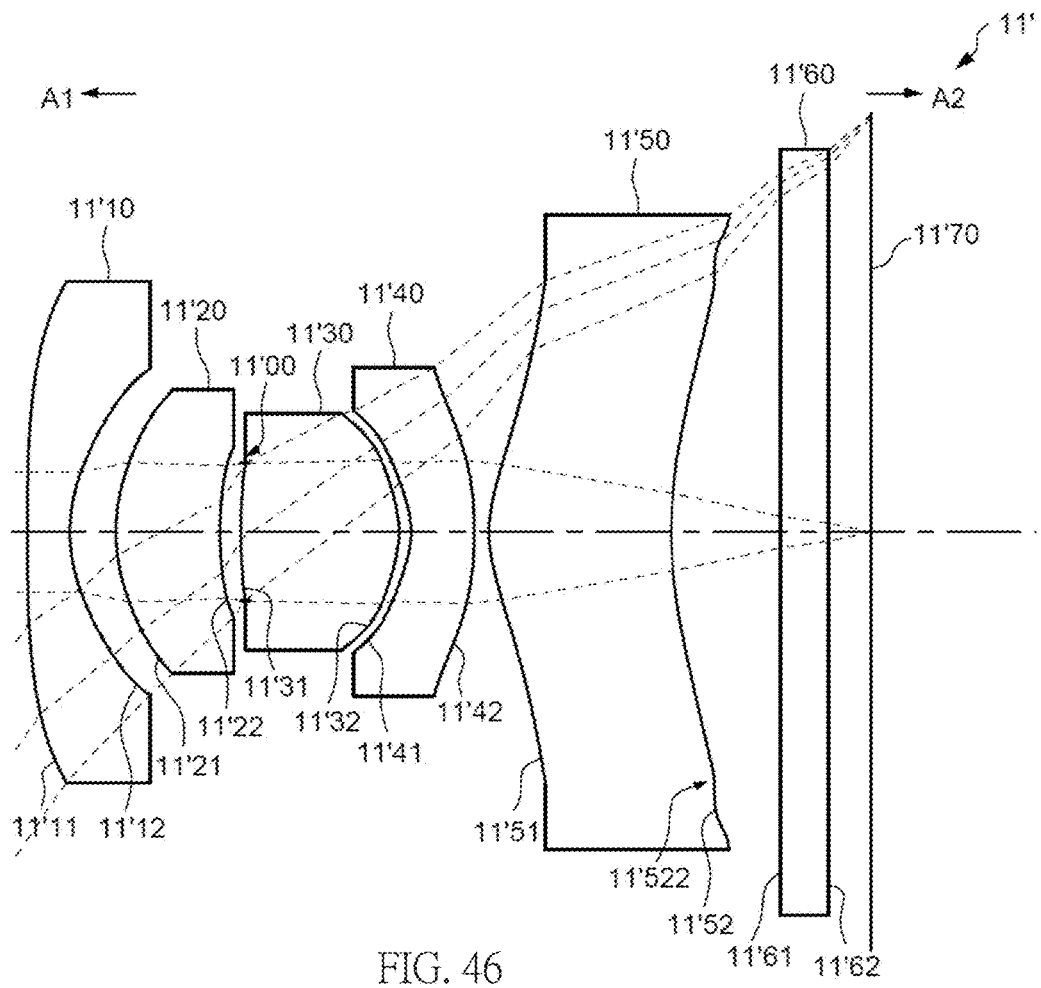
FIG. 46 depicts a cross-sectional view of a eleventh embodiment of an optical lens assembly having seven lens elements according to the present disclosure.
Figure 47:
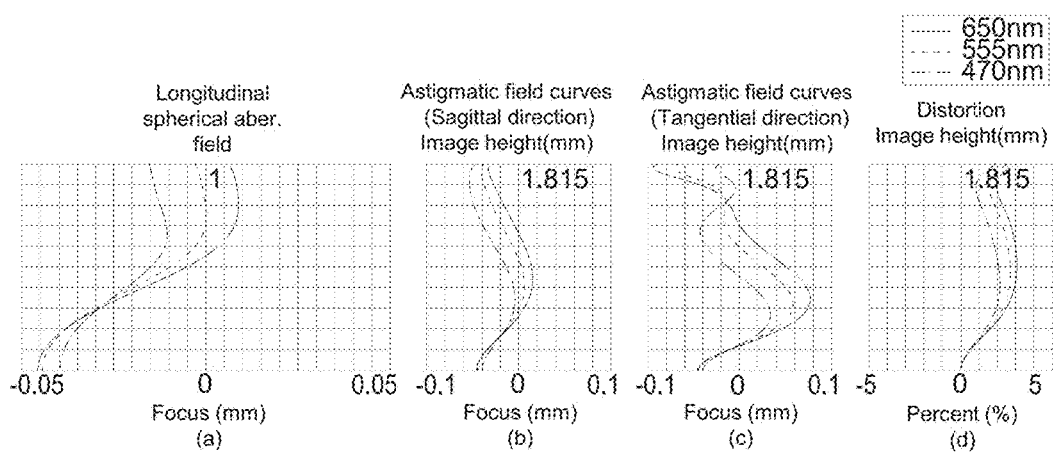
FIG. 47 depicts a chart of longitudinal spherical aberration and other kinds of optical aberrations of a eleventh embodiment of the optical lens assembly according to the present disclosure.

Reference is now made to FIGS. 46-49. FIG. 46 illustrates an example cross-sectional view of an optical lens assembly 11' having five lens elements according to a eleventh example embodiment. FIG. 47 shows example charts of longitudinal spherical aberration and other kinds of optical aberrations of the optical lens assembly 11' according to the eleventh embodiment. FIG. 48 shows an example table of optical data of each lens element of the optical lens assembly 11' according to the eleventh example embodiment. FIG. 49 shows an example table of aspherical data of the optical lens assembly 11' according to the eleventh example embodiment. The reference numbers labeled in the present embodiment are similar to those in the first embodiment for the similar elements, but here the reference numbers are initialed with 11', for example, reference number 11'31 for labeling the object-side surface of the third lens element 11'30, reference number 11'32 for labeling the image-side surface of the third lens element 11'30, etc.

As shown in FIG. 46, the optical lens assembly 11' of the present embodiment, in an order from an object side A1 to an image side A2 along an optical axis, may comprise a first lens element 11'10, a second lens element 11'20, an aperture stop 11'00, a third lens element 11'30, a fourth lens element 11'40, and a fifth lens element 11'50.

The arrangement of the convex or concave surface structures, including the object-side surfaces 11'11, 11'21, 11'31, 11'41, 11'51 and the image-side surfaces 11'12, 11'22, 11'32, 11'42 are generally similar to the optical lens assembly 1, but the differences between the optical lens assembly 1 and the optical lens assembly 11' may include the convex or concave surface structures of the image-side surface 11'52. Additional differences may include a radius of curvature, a thickness, aspherical data, and an effective focal length of each lens element. More specifically, the image-side surface 11'52 of the fifth lens element 11'50 may comprise a concave portion 11'522 in a vicinity of a periphery of the fifth lens element 11'50.

Here, for clearly showing the drawings of the present embodiment, only the surface shapes which are different from that in the first embodiment are labeled. Please refer to FIG. 48 for the optical characteristics of each lens elements in the optical lens assembly 11' of the present embodiment.

From the vertical deviation of each curve shown in FIG. 47(a), the offset of the off-axis light relative to the image point may be within about ±0.05 mm. Referring to FIG. 47(b), the focus variation with respect to the three different wavelengths (470 nm, 555 nm, 650 nm) in the whole field may fall within about ±0.06 mm. Referring to FIG. 47(c), the focus variation with respect to the three different wavelengths (470 nm, 555 nm, 650 nm) in the whole field may fall within about ±0.1 mm. Referring to FIG. 47(d), the variation of the distortion aberration of the optical lens assembly 11' may be within about ±3.5%.

The values of T1, G12, T2, G23, T3, G34, T4, G45, T5, G5F, TF, GFP, BFL, ALT, AAG, TTL, TL, AAG/T2, V2, V1-V2, V1, EFL/T5, (T1+T2)/T4, (T1+T3)/T5, (T1+G23+G45)/G12,(T1+G34+G45)/G12,(T1+G12+G23)/(T4+G45), (T1+G12+G34)/(T4+G45), EFL/T4, (T1+G12)/T2, (T1+G12)/T4, BFL/T3, BFL/T5, AAG/T1, AAG/T4, TTL/ALT and TTL/(T2+T3+T4+T5) of this embodiment may be referred to FIGS. 54A and 54B.

In comparison with the first embodiment, TTL in this embodiment may be smaller, the longitudinal spherical aberration in this embodiment may be smaller, the distortion aberration in this embodiment may be smaller. Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 50:
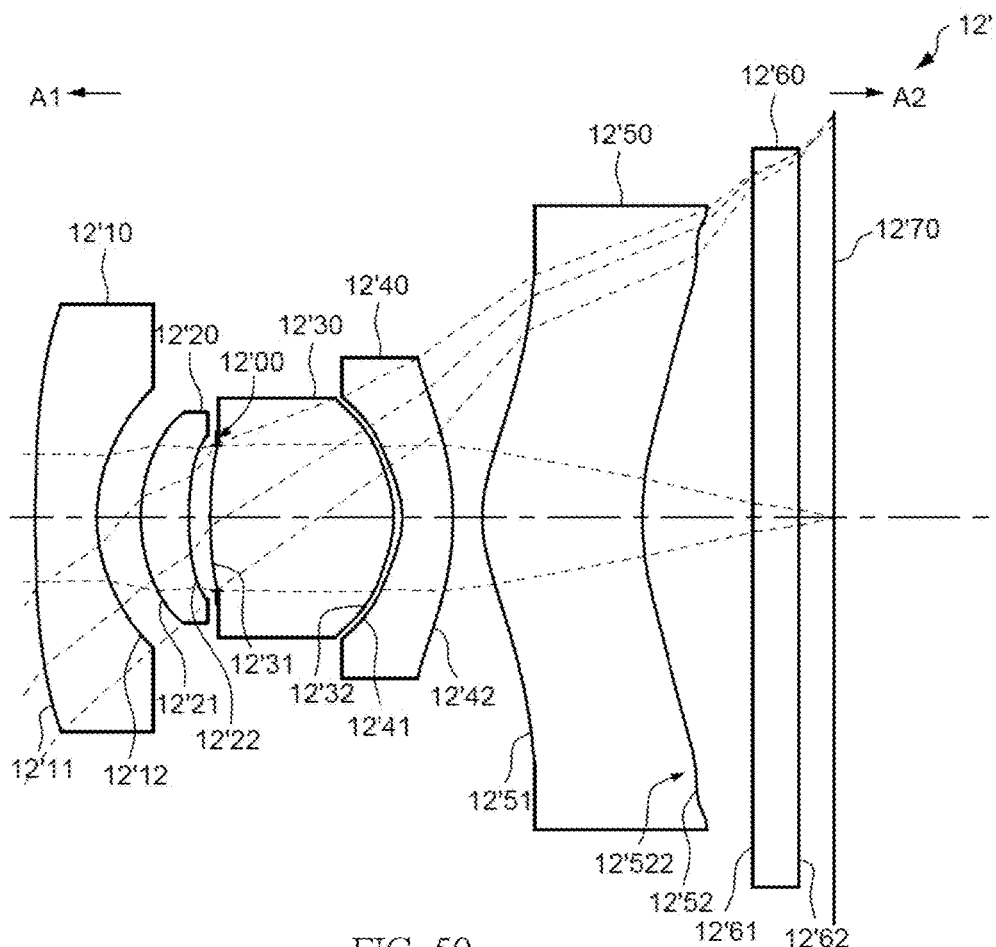
FIG. 50 depicts a cross-sectional view of a twelfth embodiment of an optical lens assembly having seven lens elements according to the present disclosure.
Figure 51:
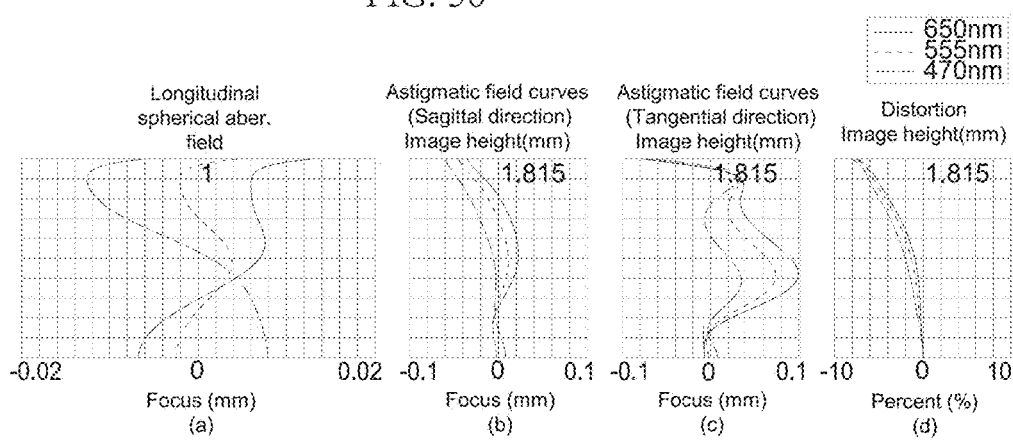
FIG. 51 depicts a chart of longitudinal spherical aberration and other kinds of optical aberrations of a twelfth embodiment of the optical lens assembly according to the present disclosure.

Reference is now made to FIGS. 50-53. FIG. 50 illustrates an example cross-sectional view of an optical lens assembly 12' having five lens elements according to a twelfth example embodiment. FIG. 51 shows example charts of longitudinal spherical aberration and other kinds of optical aberrations of the optical lens assembly 12' according to the twelfth embodiment. FIG. 52 shows an example table of optical data of each lens element of the optical lens assembly 12' according to the twelfth example embodiment. FIG. 53 shows an example table of aspherical data of the optical lens assembly 12' according to the twelfth example embodiment. The reference numbers labeled in the present embodiment are similar to those in the first embodiment for the similar elements, but here the reference numbers are initialed with 12', for example, reference number 12'31 for labeling the object-side surface of the third lens element 12'30, reference number 12'32 for labeling the image-side surface of the third lens element 12'30, etc.

As shown in FIG. 50, the optical lens assembly 12' of the present embodiment, in an order from an object side A1 to an image side A2 along an optical axis, may comprise a first lens element 12'10, a second lens element 12'20, an aperture stop 12'00, a third lens element 12'30, a fourth lens element 12'40, and a fifth lens element 12'50.

The arrangement of the convex or concave surface structures, including the object-side surfaces 12'11, 12'21, 12'31, 12'41, 12'51 and the image-side surfaces 12'12, 12'22, 12'32, 12'42 are generally similar to the optical lens assembly 1, but the differences between the optical lens assembly 1 and the optical lens assembly 12' may include the convex or concave surface structures of the image-side surface 12'52. Additional differences may include a radius of curvature, a thickness, aspherical data, and an effective focal length of each lens element. More specifically, the image-side surface 12'52 of the fifth lens element 12'50 may comprise a concave portion 12'522 in a vicinity of a periphery of the fifth lens element 12'50.

Here, for clearly showing the drawings of the present embodiment, only the surface shapes which are different from that in the first embodiment are labeled. Please refer to FIG. 52 for the optical characteristics of each lens elements in the optical lens assembly 12' of the present embodiment.

From the vertical deviation of each curve shown in FIG. 51(a), the offset of the off-axis light relative to the image point may be within about ±0.014 mm. Referring to FIG. 51(b), the focus variation with respect to the three different wavelengths (470 nm, 555 nm, 650 nm) in the whole field may fall within about ±0.06 mm. Referring to FIG. 51(c), the focus variation with respect to the three different wavelengths (470 nm, 555 nm, 650 nm) in the whole field may fall within about ±0.1 mm. Referring to FIG. 51(d), the variation of the distortion aberration of the optical lens assembly 12' may be within about ±8%.

The values of T1, G12, T2, G23, T3, G34, T4, G45, T5, G5F, TF, GFP, BFL, ALT, AAG, TTL, TL, AAG/T2, V2, V1-V2, V1, EFL/T5, (T1+T2)/T4, (T1+T3)/T5, (T1+G23+G45)/G12,(T1+G34+G45)/G12,(T1+G12+G23)/(T4+G45), (T1+G12+G34)/(T4+G45), EFL/T4, (T1+G12)/T2, (T1+G12)/T4, BFL/T3, BFL/T5, AAG/T1, AAG/T4, TTL/ALT and TTL/(T2+T3+T4+T5) of this embodiment may be referred to FIGS. 54A and 54B.

In comparison with the first embodiment, TTL in this embodiment may be smaller, the longitudinal spherical aberration in this embodiment may be smaller. Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

The values of T1, G12, T2, G23, T3, G34, T4, G45, T5, G5F, TF, GFP, BFL, ALT, AAG, TTL, TL, AAG/T2, V2, V1-V2, V1, EFL/T5, (T1+T2)/T4, (T1+T3)/T5, (T1+G23+G45)/G12,(T1+G34+G45)/G12,(T1+G12+G23)/(T4+G45), (T1+G12+G34)/(T4+G45), EFL/T4, (T1+G12)/T2, (T1+G12)/T4, BFL/T3, BFL/T5, AAG/T1, AAG/T4, TTL/ALT and TTL/(T2+T3+T4+T5)of all twelve embodiments may be referred to FIGS. 54A and 54B, and it is clear that the optical lens assembly of any one of the twelve embodiments may satisfy the Inequalities (1) to (21).

When the refracting power of the first lens element us negative, the field of view may be increased. When the object-side surface of the first lens element may comprise a convex portion in a vicinity of a periphery of the first lens element, the light having big field of view may be collected efficiently. When the objet-side surface of the second lens element may comprise a convex portion in a vicinity of the optical axis or the image-side surface of the second lens element may comprise a concave portion in a vicinity of the optical axis, the aberration caused by the first lens element may be corrected efficiently. When the refracting power of the fourth lens element is negative, the aberrations caused by the first to third lens elements may corrected efficiently.

When the image-side surface of the fifth lens element may comprise a concave portion in a vicinity of the optical axis, the aberration of light have a small incident angle may be regulated easily.

When the optical lens assembly satisfies an inequality: AAG/T2≤2.9, the thickness of the second lens element may not be too small to collect lights. When a more perfect range of AAG/T2 satisfies an inequality: 0.8≤AAG/T2≤2.9, the air gaps and the length of the optical lens assembly may be decreased and the field of view may be increased. Moreover, when a more perfect range of AAG/T2 satisfies an inequality: 0.8≤AAG/T2≤2.2, the thickness of the second lens element and air gaps may not be too small, so that the design and manufacture of the optical lens assembly may be easier.

When the optical lens assembly satisfies an inequality: V2≤32, the aberration caused by the second lens element may be decreased efficiently and the longitudinal spherical aberration may be decreased, wherein a more perfect range of V2 satisfies an inequality: 20≤V2≤32.

When the optical lens assembly satisfies an inequality: 20≤V1−V2, the aberration caused by the first and second lens elements may be decreased, wherein a more perfect range of V1−V2 satisfies an inequality: 20≤V1−V2≤40.

When the optical lens assembly satisfies an inequality: 50≤V1, the aberration caused by the first lens element may be decreased and the longitudinal spherical aberration may be decreased, wherein a more perfect range of V1 may satisfy an inequality: 50≤V1≤60.

When any one of optical parameters is too large to correct the aberration easily. When any one of optical parameter is too small, the assembly and manufacture of the optical lens assembly is more difficult. For maintaining suitable values of focus length and optical parameters, the optical lens assembly may satisfy any one of inequality as follow:

EFL/T4≤6, and a more perfect range may satisfy 1.8≤EFL/T4≤6;

EFL/T5≤4, and a more perfect range may satisfy 0.7≤EFL/T5≤4.

For shortening the length of the optical lens assembly, the thickness of each lens element and air gaps between adjacent lens elements should be decreased appropriately. However, the design of the thickness of each lens element may consider the air gaps if the optical lens assembly needs to be manufactured more easily and to provide a better imaging quality. Therefore, the arrangement of the optical lens assembly may be better while the optical lens assembly satisfies inequalities as follows:

(T1+T2)/T4≤3.6, and a more perfect range may satisfy 1.6≤(T1+T2)/T4≤3.6;

(T1+T3)/T5≤2.5, and a more perfect range may satisfy 1.1≤(T1+T3)/T5≤2.5;

(T1+G23+G45)/G12≤2.61, and a more perfect range may satisfy 0.75≤(T1+G23+G45)/G2≤2.61 ;

(T1+G34+G45)/G12≤2.9, and a more perfect range may satisfy 0.9≤(T1+G23+G45)/G12≤2.9;

(T1+G12+G23)/(T4+G45)≤2.6, and a more perfect range may satisfy 0.9≤(T1+G12+G23)/(T4+G45)≤2.6 ;

(T1+G12+G34)/(T4+G45)≤2.5, and a more perfect range may satisfy 0.9≤(T1+G12+G34)/(T4+G45)≤2.5;

(T1+G12)/T2≤2.25, and a more perfect range may satisfy 0.7≤(T1+G12)/T2≤2.25;

(T1+G12)/T4≤3.5, and a more perfect range may satisfy 1.37≤(T1+G2)/T4≤3.5;

BFL/T3≤2, and a more perfect range may satisfy 0.6≤BFL/T3≤2;

BFL/T5≤2.5, and a more perfect range may satisfy 1≤BFL/T5≤2.5;

AAG/T2≤2.9, and a more perfect range may satisfy 0.8≤AAG/T2≤2.9;
AAG/T4≤2.7, and a more perfect range may satisfy 1.39≤AAG/T4≤2.7;
TTL/ALT≤1.8, and a more perfect range may satisfy 1.3≤TTL/ALT≤1.8;
TTL/ALT≤1.8, and a more perfect range may satisfy 1≤TTL/(T2+T3+T4+T5)≤1.6.

Moreover, the optical parameters according to one embodiment could be selectively incorporated in other embodiments to limit and enhance the structure of the optical lens assembly. In consideration of the non-predictability of the optical lens assembly, while the optical lens assembly may satisfy any one of inequalities described above, the optical lens assembly herein perfectly may achieve a shorten length, provide an enlarged aperture stop, increase an imaging quality and/or assembly yield, and/or effectively improve drawbacks of a typical optical lens assembly.

Any one of the aforementioned inequalities could be selectively incorporated in other inequalities to apply to the present embodiments, but are not limited. Embodiments according to the present disclosure are not limited and could be selectively incorporated in other embodiments described herein. In some embodiments, more details about the parameters could be incorporated to enhance the control for the system performance and/or resolution. For example, the object-side surface of the first lens element may comprise a convex portion in a vicinity of the optical axis. It is noted that the details listed here could be incorporated into example embodiments if no inconsistency occurs.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical lens assembly, sequentially from an object side to an image side along an optical axis, comprising first, second, third, fourth, and fifth lens elements, each of the first, second, third, fourth, and fifth lens elements having refracting power, an object-side surface facing toward the object side, an image-side surface facing toward the image side, the optical lens assembly comprising no other lens elements having refracting power beyond the first, second, third, fourth, and fifth lens elements wherein:
the first lens element has negative refracting power, and the object-side surface of the first lens element comprises a convex portion in a vicinity of a periphery of the first lens element;
the object-side surface of the second lens element comprises a convex portion in a vicinity of the optical axis;
the fourth lens element has negative refracting power;
the image-side surface of the fifth lens element comprises a concave portion in a vicinity of the optical axis;
a sum of air gaps from the first to the fifth lens elements along the optical axis is represented by AAG, a central thickness of the second lens element along the optical axis is represented by T2, an abbe number of the second lens element is represented by V2, and the optical lens assembly satisfies inequalities:

$AAG/T2 \leq 2.9$; and $V2 \leq 32$.

2. The optical lens assembly according to claim 1, wherein an abbe number of the first lens element is represented by V1, and the optical lens assembly further satisfies an inequality: V1-V2≥20.

3. The optical lens assembly according to claim 1, wherein an abbe number of the first lens element is represented by V1, and the optical lens assembly further satisfies an inequality: V1≥50.

4. The optical lens assembly according to claim 1, wherein an effective focal length of the optical lens assembly is represented by EFL, a central thickness of the fifth lens element along the optical axis is represented by T5, and the optical lens assembly further satisfies an inequality: EFL/T5≤4.

5. The optical lens assembly according to claim 1, wherein a central thickness of the first lens element along the optical axis is represented by T1, a central thickness of the fourth lens element along the optical axis is represented by T4, and the optical lens assembly further satisfies an inequality: (T1+T2)/T4≤3.6.

6. The optical lens assembly according to claim 1, wherein a central thickness of the first lens element along the optical axis is represented by T1, an air gap between the second lens element and the third lens element along the optical axis is represented by G23, an air gap between the fourth lens element and the fifth lens element along the optical axis is represented by G45, an air gap between the first lens element and the second lens element along the optical axis is represented by G12, and the optical lens assembly further satisfies an inequality: (T1+G23+G45)/G12≤2.61.

7. The optical lens assembly according to claim 1, wherein a central thickness of the first lens element along the optical axis is represented by T1, an air gap between the second lens element and the third lens element along the optical axis is represented by G23, an air gap between the fourth lens element and the fifth lens element along the optical axis is represented by G45, an air gap between the first lens element and the second lens element along the optical axis is represented by G12, a central thickness of the fourth lens element along the optical axis is represented by T4, and the optical lens assembly further satisfies an inequality: (T1+G12+G23)/(T4+G45)≤2.6.

8. The optical lens assembly according to claim 1, wherein a distance from the image-side surface of the fifth lens element to an image plane along the optical axis is represented by BFL, a central thickness of the third lens element along the optical axis is represented by T3, and the optical lens assembly further satisfies an inequality: BFL/T3≤2.

9. The optical lens assembly according to claim 1, wherein a central thickness of the first lens element along the optical axis is represented by T1, and the optical lens assembly further satisfies an inequality: AAG/T1≤2.25.

10. The optical lens assembly according to claim 1, wherein a distance between the object-side surface of the first lens element and an image plane along the optical axis is represented by TTL, a sum of central thicknesses from the first to the fifth lens elements along the optical axis is represented by ALT, and the optical lens assembly further satisfies an inequality: TTL/ALT≤1.8.

11. An optical lens assembly, sequentially from an object side to an image side along an optical axis, comprising first, second, third, fourth, and fifth lens elements, each of the first, second, third, fourth, and fifth lens elements having refracting power, an object-side surface facing toward the object side, an image-side surface facing toward the image side, the optical lens assembly comprising no other lens elements having refracting power beyond the first, second, third, fourth, and fifth lens elements wherein:
   the refracting power of the first lens element has negative refracting power, and the object-side surface of the first lens element comprises a convex portion in a vicinity of a periphery of the first lens element;
   the image-side surface of the second lens element comprises a concave portion in a vicinity of the optical axis;
   the fourth lens element has negative refracting power;
   the image-side surface of the fifth lens element comprises a concave portion in a vicinity of the optical axis;
   a sum of air gaps from the first to the fifth lens elements along the optical axis is represented by AAG, a central thickness of the second lens element along the optical axis is represented by T2, and the optical lens assembly satisfies inequalities: AAG/T2≤2.2.

12. The optical lens assembly according to claim 11, wherein an effective focal length of the optical lens assembly is represented by EFL, a central thickness of the fourth lens element along the optical axis is represented by T4, and the optical lens assembly further satisfies an inequality: EFL/T4≤6.

13. The optical lens assembly according to claim 11, wherein a central thickness of the first lens element along the optical axis is represented by T1, a central thickness of the third lens element along the optical axis is represented by T3, a central thickness of the fifth lens element along the optical axis is represented by T5, and the optical lens assembly further satisfies an inequality: (T1+T3)/T5≤2.5.

14. The optical lens assembly according to claim 11, wherein a central thickness of the first lens element along the optical axis is represented by T1, an air gap between the third lens element and the fourth lens element along the optical axis is represented by G34, an air gap between the fourth lens element and the fifth lens element along the optical axis is represented by G45, an air gap between the first lens element and the second lens element along the optical axis is represented by G12, and the optical lens assembly further satisfies an inequality: (T1+G34+G45)/G12≤2.9.

15. The optical lens assembly according to claim 11, wherein a central thickness of the first lens element along the optical axis is represented by T1, an air gap between the third lens element and the fourth lens element along the optical axis is represented by G34, an air gap between the fourth lens element and the fifth lens element along the optical axis is represented by G45, an air gap between the first lens element and the second lens element along the optical axis is represented by G12, and the optical lens assembly further satisfies an inequality: (T1+G12+G34)/(T4+G45)≤2.5.

16. The optical lens assembly according to claim 11, wherein a central thickness of the first lens element along the optical axis is represented by T1, an air gap between the first lens element and the second lens element along the optical axis is represented by G12, and the optical lens assembly further satisfies an inequality: (T1+G12)/T2≤2.25.

17. The optical lens assembly according to claim 11, wherein a central thickness of the first lens element along the optical axis is represented by T1, an air gap between the first lens element and the second lens element along the optical axis is represented by G12, a central thickness of the fourth lens element along the optical axis is represented by T4, and the optical lens assembly further satisfies an inequality: (T1+G12)/T4≤3.5.

18. The optical lens assembly according to claim 11, wherein a distance from the image-side surface of the fifth lens element to an image plane along the optical axis is represented by BFL, a central thickness of the fifth lens element along the optical axis is represented by T5, and the optical lens assembly further satisfies an inequality: BFL/T5≤2.5.

19. The optical lens assembly according to claim 11, wherein a central thickness of the fourth lens element along the optical axis is represented by T4, and the optical lens assembly further satisfies an inequality: AAG/T4≤2.7.

20. The optical lens assembly according to claim 11, wherein a distance from the object-side surface of the first lens element to the image-side surface of the fifth lens element along the optical axis is represented by TL, a central thickness of the third lens element along the optical axis is represented by T3, a central thickness of the fourth lens element along the optical axis is represented by T4, a central thickness of the fifth lens element along the optical axis is represented by T5, and the optical lens assembly further satisfies an inequality: TL/(T2+T3+T4+T5)≤1.6.

* * * * *